United States Patent [19]
Hilliard et al.

[11] Patent Number: 5,992,917
[45] Date of Patent: Nov. 30, 1999

[54] TOP SYSTEM FOR A MOTOR VEHICLE

[75] Inventors: Michael E. Hilliard, Plymouth; Louis D. DeLellis, South Lyon; William A. Grabowski, Northville; Stephen K. Tebbutt, West Bloomfield, all of Mich.

[73] Assignee: Chrysler Corporation, Auburn Hills, Mich.

[21] Appl. No.: 08/955,536

[22] Filed: Oct. 22, 1997

Related U.S. Application Data

[60] Provisional application No. 60/029,154, Oct. 22, 1996, provisional application No. 60/028,994, Oct. 23, 1996, provisional application No. 60/028,995, Oct. 23, 1996, provisional application No. 60/028,996, Oct. 23, 1996, provisional application No. 60/028,997, Oct. 23, 1996, provisional application No. 60/028,998, Oct. 23, 1996, provisional application No. 60/028,999, Oct. 23, 1996, and provisional application No. 60/029,737, Nov. 23, 1996.

[51] Int. Cl.$^6$ .................................. B60J 7/10; B60J 7/12
[52] U.S. Cl. ..................... 296/103; 296/121; 296/107.09
[58] Field of Search ..................... 296/102, 103, 296/100.15, 100.16, 100.18, 224 (U.S. only), 210 (U.S. only), 138 (U.S. only), 121, 107.09

[56] References Cited

U.S. PATENT DOCUMENTS

| | | | |
|---|---|---|---|
| 974,072 | 10/1910 | Kenyon . | |
| 1,741,318 | 12/1929 | Kroh . | |
| 1,808,298 | 6/1931 | Du Pont . | |
| 2,580,337 | 12/1951 | Votypka | 296/107 |
| 2,682,427 | 6/1954 | Bright | 296/44 |
| 2,697,633 | 12/1954 | Slason | 296/116 |
| 2,817,345 | 12/1957 | Woodruff, Sr. | 135/6 |
| 2,823,684 | 2/1958 | Sartori | 135/6 |
| 2,864,388 | 12/1958 | Oliver | 135/1 |
| 3,285,259 | 11/1966 | Hale | 135/6 |
| 3,307,566 | 3/1967 | Hale | 135/6 |
| 3,328,073 | 6/1967 | Einhorn | 296/136 |
| 3,367,349 | 2/1968 | O'Link | 135/6 |

(List continued on next page.)

FOREIGN PATENT DOCUMENTS

| | | |
|---|---|---|
| 0 146 884 | 12/1984 | European Pat. Off. . |
| 129392 | 7/1932 | Germany . |
| 1152899 | 8/1963 | Germany . |
| 3127525 | 1/1983 | Germany . |
| 004114823 A1 | 11/1992 | Germany . |
| 0192631 | 8/1988 | Japan . |
| 0164623 | 6/1989 | Japan . |
| 0204129 | 8/1990 | Japan . |
| 406106986 | 4/1994 | Japan . |
| 406106989 | 4/1994 | Japan . |
| 406106990 | 4/1994 | Japan . |
| 0652977 | 12/1985 | Switzerland . |
| 486283 | 6/1938 | United Kingdom . |
| 843638 | 8/1960 | United Kingdom ................... 296/121 |

OTHER PUBLICATIONS

Robert C. Ackerson, Standard Catalog of 4×4's 1945–1993, pp. 385–415.

*Primary Examiner*—Dennis H. Pedder
*Attorney, Agent, or Firm*—James R. Yee

[57] ABSTRACT

A top system includes a hard top which may be operatively installed over a folded soft top. The top system allows delivery of both the hard top and the soft top to the customer. Additionally, the top system allows for an expanded range of uses of the associated motor vehicle. The owner/user can have the hard top on for greater comfort and less noise on long trips and on arrival, take the hard top off and have the soft top for local use with the benefit of open air driving. The soft top is ready to be moved to its operative position or retained in the stored position for available protection from the element from adverse weather conditions. The ability of the top system to allow the hard top to be operatively installed over the folded soft top is made possible largely in part due to the several unique aspects. For example, the soft top folds back and is contained within the boundaries of the body side of the motor vehicle and the tailgate area while having a low stack height. The hard top has formations to allow the stored soft top to nest within the hard top. Additionally, retainer members welded onto the body side section allow the hard top and soft top to function interchangeable.

17 Claims, 14 Drawing Sheets

U.S. PATENT DOCUMENTS

| | | | |
|---|---|---|---|
| 3,371,672 | 3/1968 | Hale et al. | 135/6 |
| 3,536,354 | 10/1970 | Ingram | 296/147 |
| 3,773,379 | 11/1973 | Loiseau | 296/107 |
| 3,994,524 | 11/1976 | Lehmann | 296/107 |
| 4,066,292 | 1/1978 | Carli | 296/137 |
| 4,260,188 | 4/1981 | Bauer | 296/431 |
| 4,310,194 | 1/1982 | Biller | 296/159 |
| 4,402,544 | 9/1983 | Artim et al. | 296/110 |
| 4,440,436 | 4/1984 | Giddens et al. | 296/107 |
| 4,593,641 | 6/1986 | Adams et al. | 114/343 |
| 4,639,034 | 1/1987 | Amos | 296/100 |
| 4,729,593 | 3/1988 | Nisiguchi et al. | 296/154 |
| 4,789,196 | 12/1988 | Fields | 296/100 |
| 4,828,317 | 5/1989 | Muscat | 296/122 |
| 4,850,634 | 7/1989 | Taubitz | 296/107 |
| 4,898,420 | 2/1990 | Takada | 296/219 |
| 4,915,440 | 4/1990 | Daniel et al. | 296/104 |
| 4,927,202 | 5/1990 | Wagner | 296/107 |
| 4,964,669 | 10/1990 | Geier | 296/108 |
| 5,004,291 | 4/1991 | Bauer et al. | 296/116 |
| 5,005,896 | 4/1991 | Li | 296/100 |
| 5,033,788 | 7/1991 | Raj | 296/136 |
| 5,042,868 | 8/1991 | Nothaft et al. | 296/107 |
| 5,058,943 | 10/1991 | Louderback | 296/107 |
| 5,066,063 | 11/1991 | Mullally | 296/100 |
| 5,072,987 | 12/1991 | Allen | 296/107 |
| 5,238,288 | 8/1993 | Chandler | 296/100 |
| 5,299,850 | 4/1994 | Kaneko et al. | 296/107 |
| 5,303,667 | 4/1994 | Zirkelbach et al. | 114/361 |
| 5,385,377 | 1/1995 | Girard | 296/36 |
| 5,489,146 | 2/1996 | Fischbach | 296/102 |
| 5,531,497 | 7/1996 | Cheng | 296/100 |
| 5,556,156 | 9/1996 | Kirk | 296/100 |
| 5,673,959 | 10/1997 | Padlo | 296/116 |
| 5,765,903 | 6/1998 | Essig et al. | 296/102 |

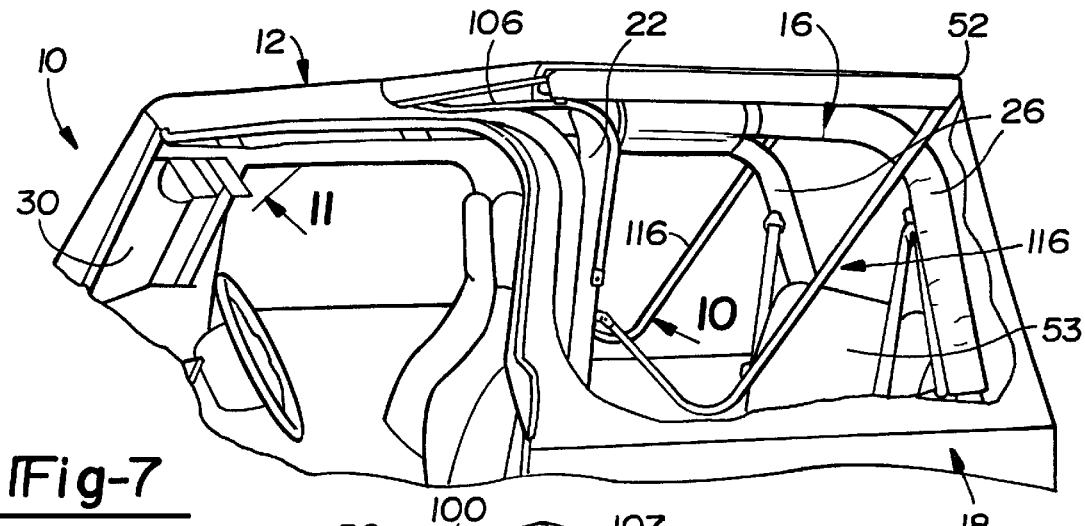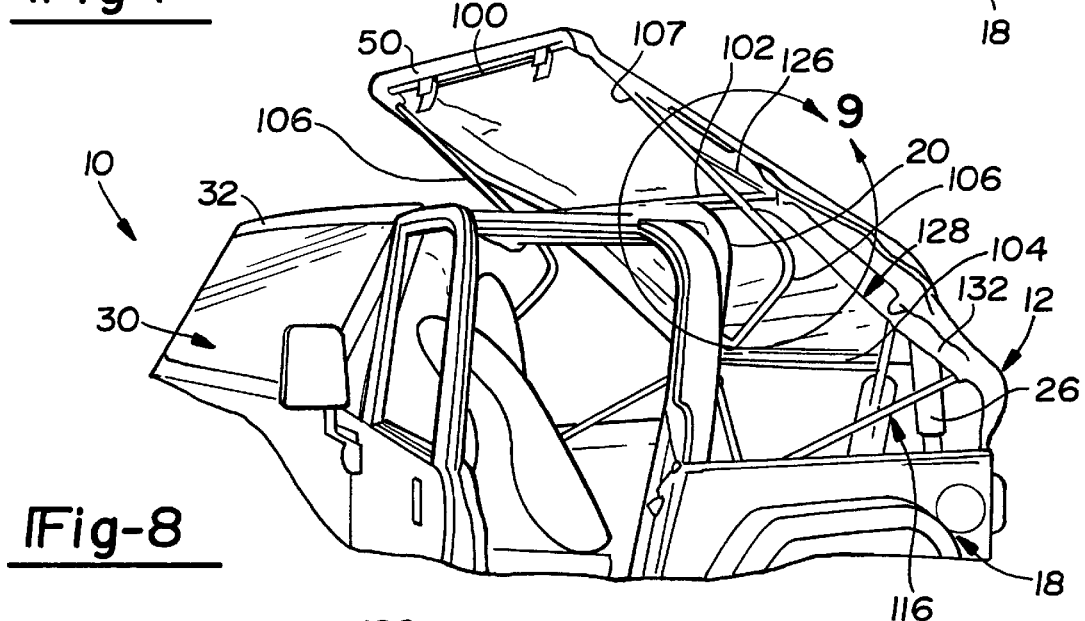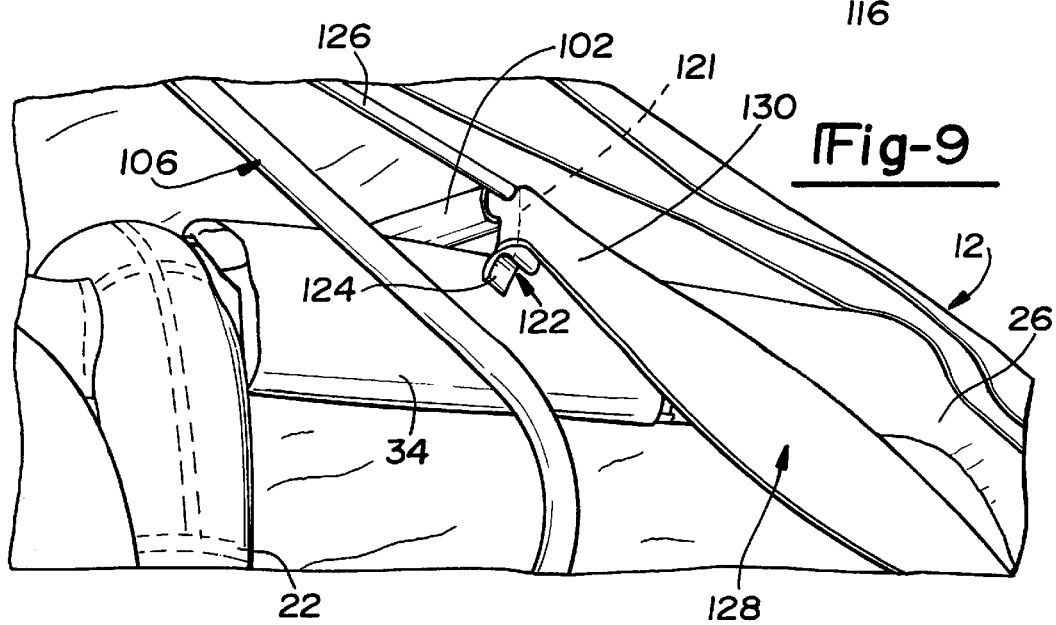

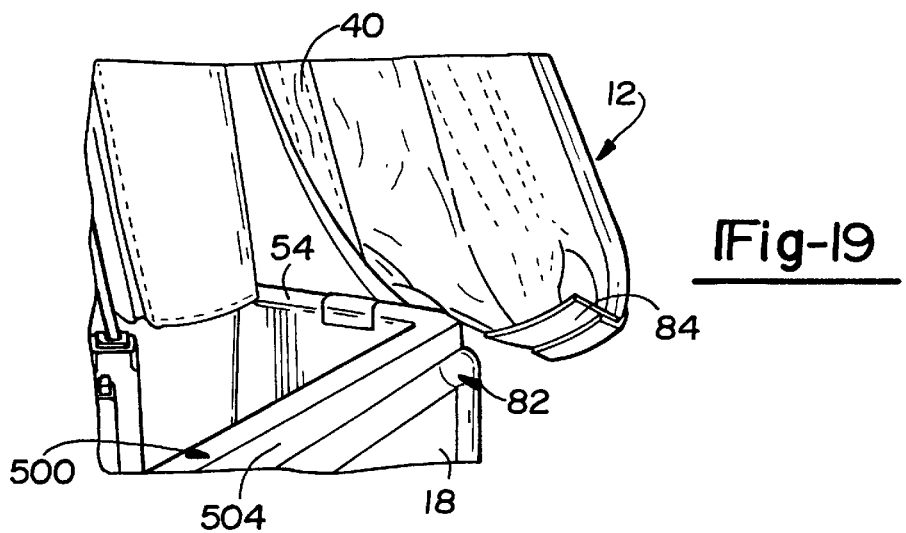
Fig-19
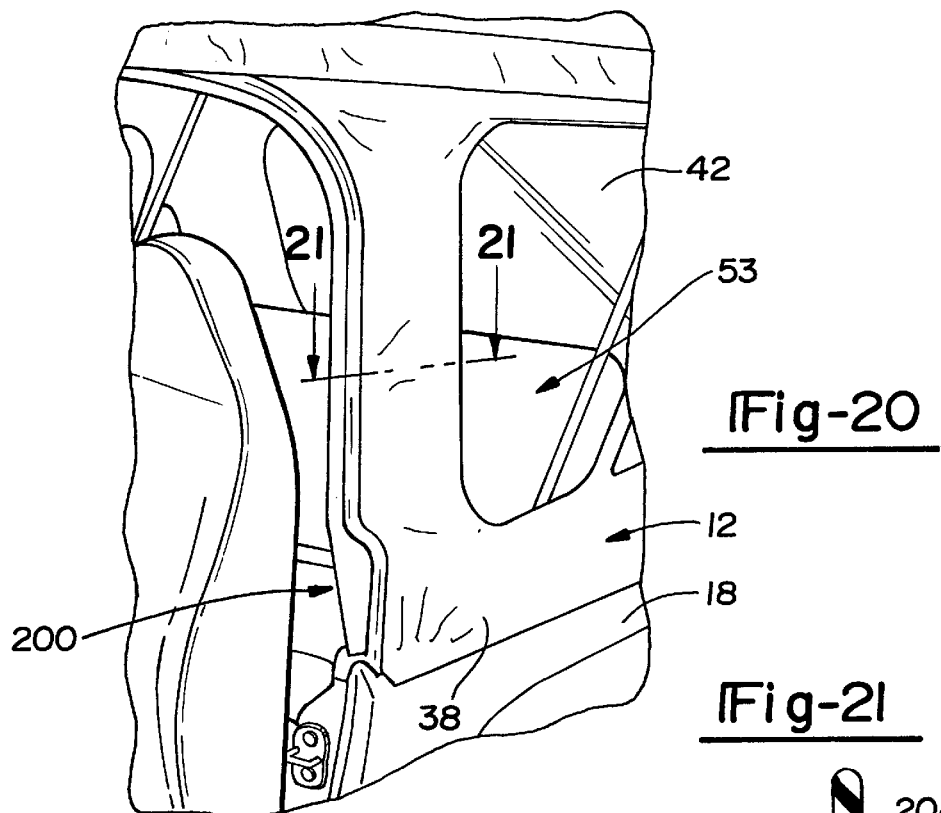
Fig-20
Fig-21
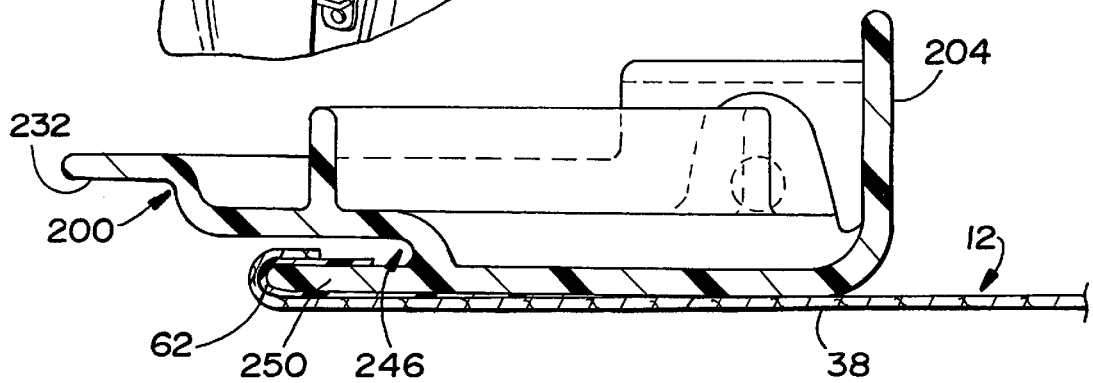

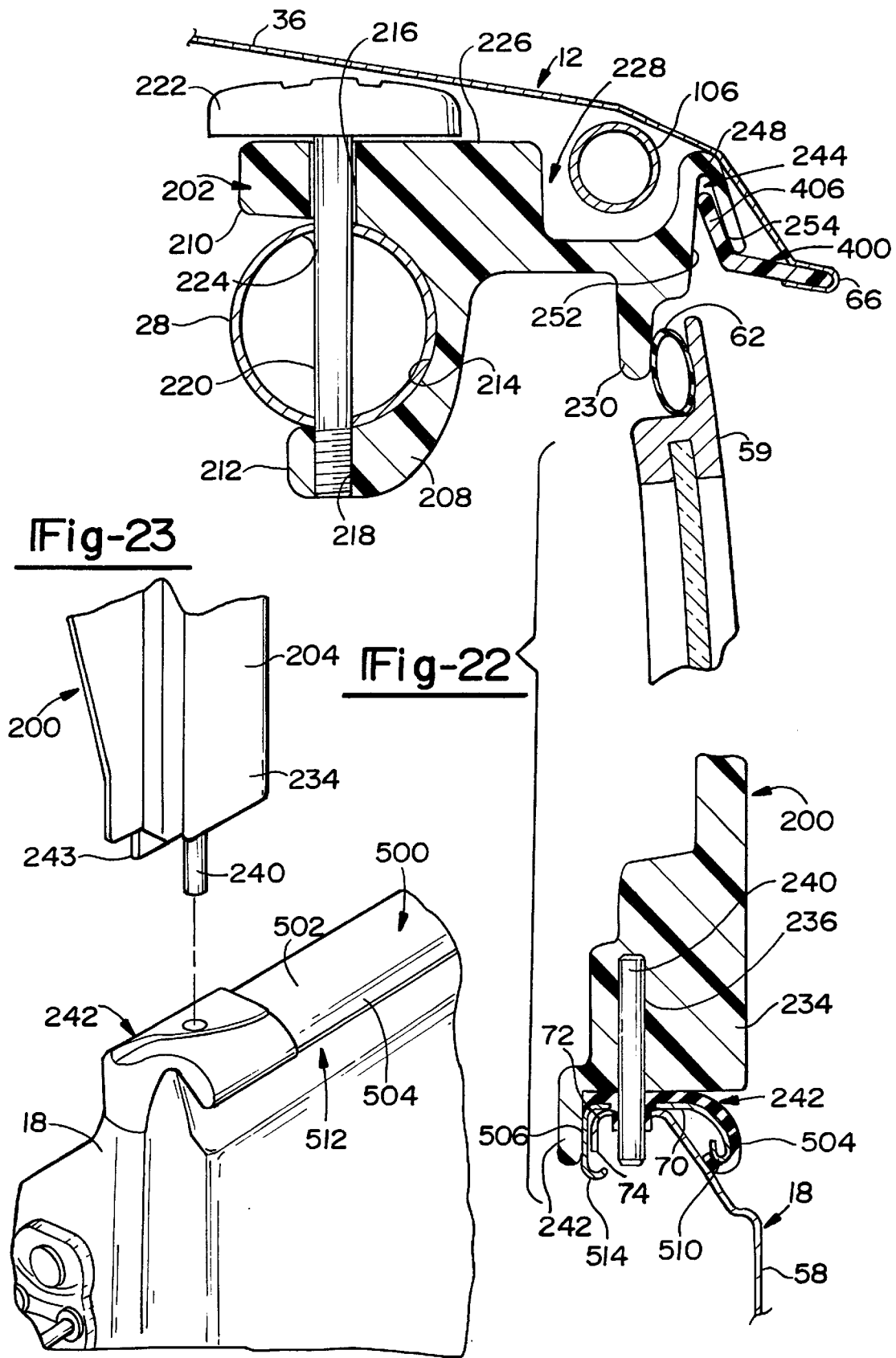

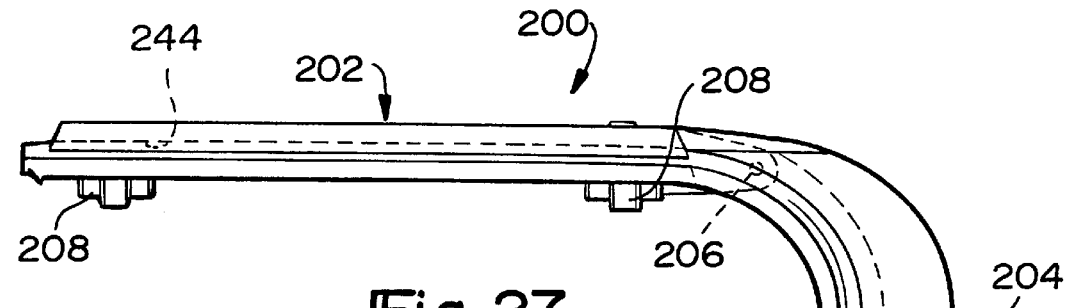
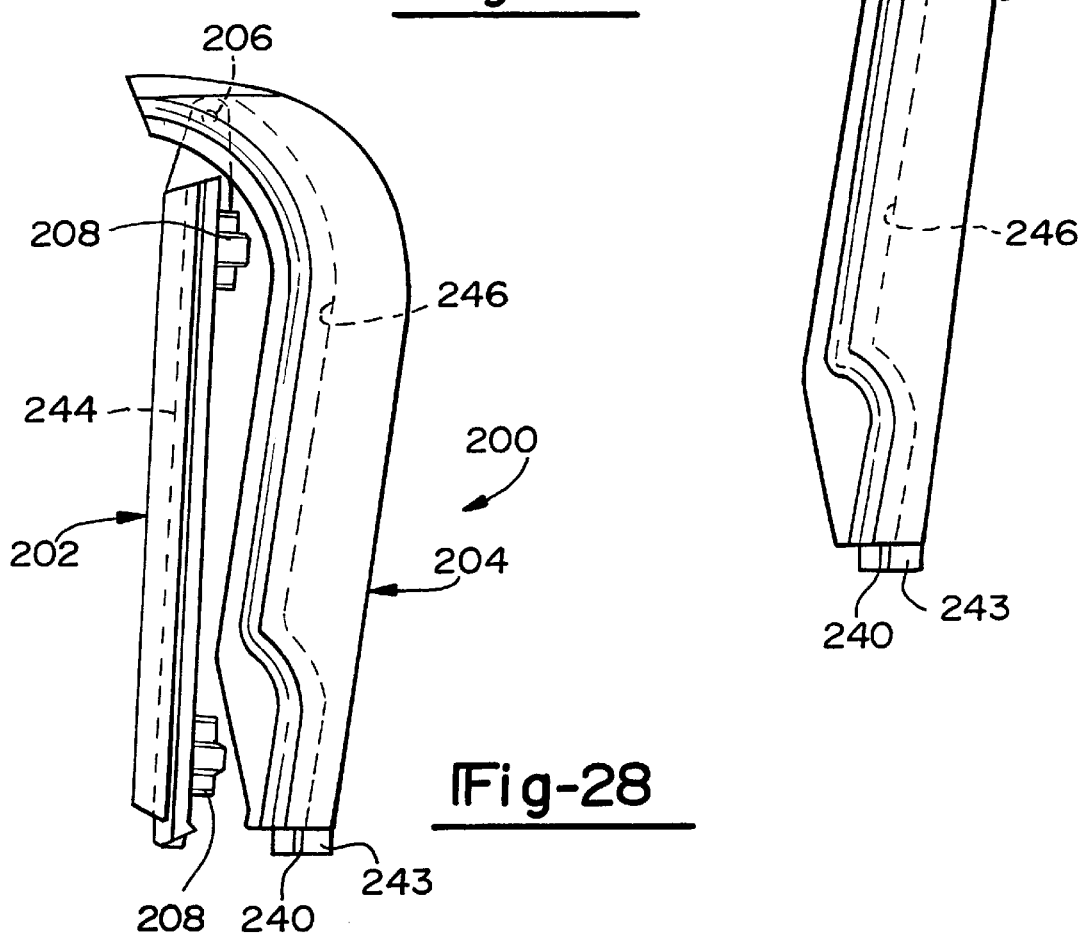

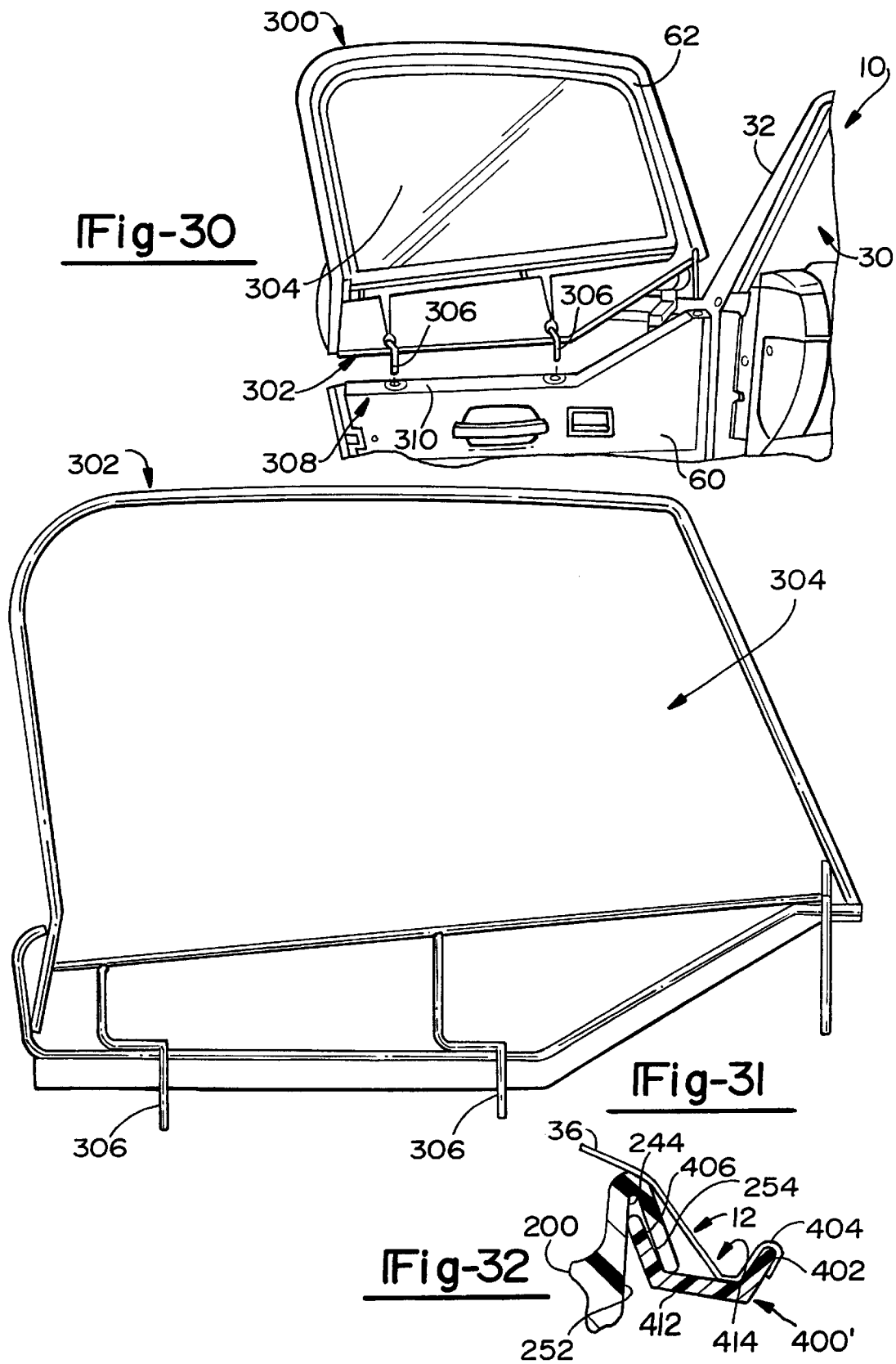

TOP SYSTEM FOR A MOTOR VEHICLE

CROSS-REFERENCE TO RELATED APPLICATIONS

This is a conventional application based on provisional application 60/029,154, filed Oct. 22, 1996 and 06/029,737, filed Nov. 23, 1996 and the provisional applications filed Oct. 23, 1996 assigned the following U.S. Ser. Nos. 60/028,994; 60/028,995; 60/028,996; 60/028,997; 60/028,998; and 60/028,999.

BACKGROUND OF THE INVENTION

1. Field of the Invention

The present invention generally relates to a top system for a motor vehicle. More particularly, the present invention relates to a top system for a motor vehicle including a soft top which can be stored on the motor vehicle beneath a hard top.

2. Discussion

It is well known in the motor vehicle art to provide a convertible top which may be folded back or removed from the vehicle. In one common form, the convertible top is constructed of a flexible fabric (referred to as a soft top) and can be folded back to a storage position or otherwise removed from an installed position. In another common form, the convertible top is constructed from a rigid material such as plastic and/or metal (referred to as a hard top) and is intended to be completely removed from the vehicle.

Soft tops are desired by a large segment of purchasers since they provide the user with the benefit of open air driving while affording available protection in the event of adverse weather conditions. Most known soft tops are designed to be easily retracted to a stored position, either under a source of power or manually. Other factors which make soft tops desirable include less associated expense, readily removable panels, and compact storage size. Among other advantages, vehicle hard tops provide for greater comfort and noise due to reduced wind and road noise and improved insulation from extreme ambient conditions.

It is also known in the art of motor vehicles to provide a single motor vehicle designed to cooperate with both a soft top and a hard top. One such vehicle is sold by the assignee of the present application under their registered trademark JEEP. While JEEP® brand vehicles having top systems with both a soft top and a hard top have been extremely popular with consumers, it remains desirable to further improve certain aspects of such top systems. The present invention addresses improvements to known top systems for motor vehicles, including the top system for JEEP® brand vehicles.

SUMMARY OF THE INVENTION

It is a principal object of the present invention to provide a top system for a motor vehicle which permits a soft top and a hard top to be simultaneously installed on the vehicle, thereby permitting easier delivery of both tops to the customer and allowing for an expanded range of uses of the vehicle. In this regard, such a top system allows the owner/user to install the hard top for greater comfort and less wind and road noise on long trips, and upon arrival, remove the hard top, with the soft top retained in its stored position or operative position for local use with the benefit of open air driving, while continuing to have protection available from adverse weather conditions.

In one form, the present invention provides a top system for a motor vehicle having a body side panel. The top system includes a hard top and a soft top. The soft top is adapted to be removably attached to the motor vehicle and articulate between an operative position and a stored position. The hard top is adapted to removably attach to the motor vehicle when the soft top is either removed from the motor vehicle or articulated to the stored position.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 7 is an enlarged side view of a portion of the exemplary motor vehicle of FIGS. 1 and 2, partially cutaway to illustrate the support arrangement for the soft top.

FIG. 8 is an enlarged partial view of the exemplary motor vehicle of FIG. 1 and 2 similar to FIG. 7, illustrating the soft top rotated to an intermediate position.

FIG. 9 is an enlarged view detailing the area identified in Circle 9 of FIG. 8.

FIG. 19 is a perspective view illustrating the step of attaching the rear corner retainers for the soft top.

FIG. 20 is an enlarged view of a portion of the exemplary motor vehicle of FIGS. 1 and 2.

FIG. 21 is a cross-sectional view taken along the line 21—21 of FIG. 20.

FIG. 22 is a cross-sectional vertically view taken through the removable door frame assembly of the present invention as it is operatively attached to the motor vehicle.

FIG. 23 is an exploded view of a portion of the motor vehicle of FIGS. 1 and 2, illustrating the interconnection between the vehicle body and the removable door frame assembly.

FIG. 27 is a side view of the removable frame member of FIG. 20 illustrated in its operative position.

FIG. 28 is a side view of the removable door frame assembly of FIG. 20 illustrated collapsed to a stored position.

FIG. 30 is a rear side view of the removable window assembly of the present invention illustrated prior to attachment to the lower door assembly of the motor vehicle.

FIG. 31 is a rear side view of the frame of the removable window assembly of the present invention.

FIG. 32 is a portion of the cross-sectional view of FIG. 22 illustrating an alternative retainer element for interconnecting the soft top and the removable door frame assembly.

DETAILED DESCRIPTION OF THE PREFERRED EMBODIMENT

Figure 1:
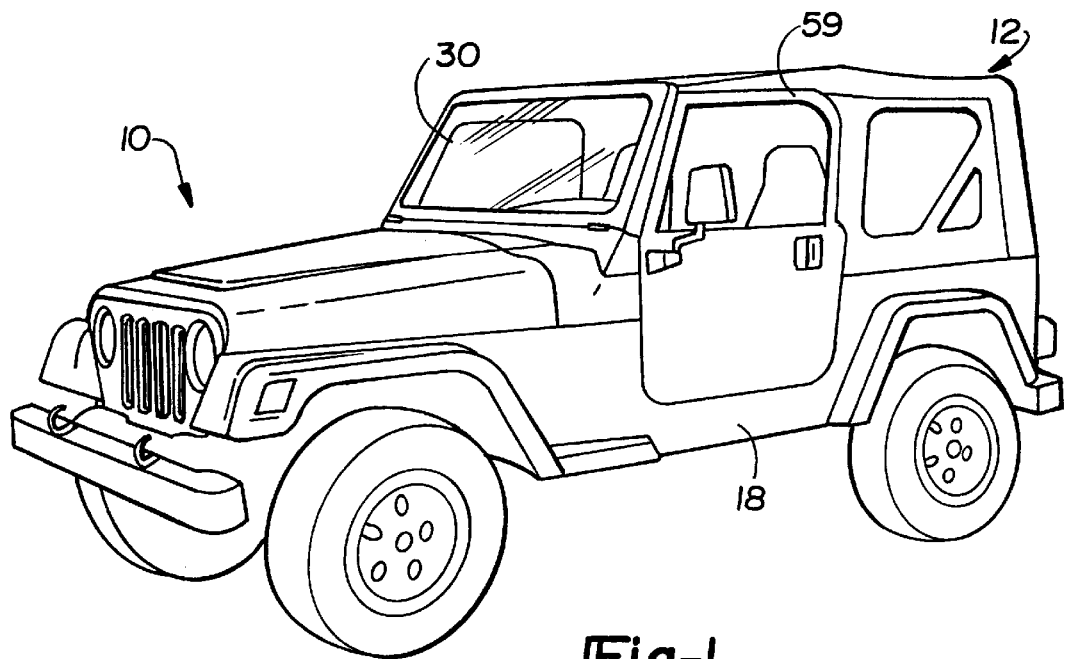
FIG. 1 is a front perspective view of an exemplary motor vehicle incorporating the teachings of the preferred embodiment of the present invention, shown with the soft top in an operative position.

The present invention relates to various aspects of an improved top system for a motor vehicle. As will become apparent from the remainder of this detailed description, the present invention more particularly relates to features of a top system which preferably includes both a hard top and a soft top. These features, which are described in detail below, are shown in the drawings cooperatively arranged within a single preferred embodiment. However, it will be appreciated that the scope of the present invention as it independently relates to each of the features described is not so limited. In other words, while a preferred embodiment of a motor vehicle is shown and described, it will be understood that the various features may be utilized independent from one another. Furthermore, it will be understood that the remainder of the motor vehicle illustrated throughout the drawings is only exemplary, the teachings of the present invention being applicable for a wide range of applications.

The principal features of the present invention which will be discussed in detail below relate to: (1) an apparatus for articulating the soft top between an operative position and a stored position; (2) a removable door frame assembly; (3) a removable door window assembly; (4) a retainer member for attaching the soft top to the motor vehicle and shingling water away from the vehicle; (5) a multi-purpose retainer for the motor vehicle which facilitates selective attachment of the hard top and the soft top; (6) a latching arrangement for latching one of the tops to the motor vehicle; and (7) a top system in which the hard top may be operatively installed over the soft top. Prior to addressing the particular features of the present invention, a brief introduction of the exemplary vehicle as it relates thereto is warranted.

Figure 2:
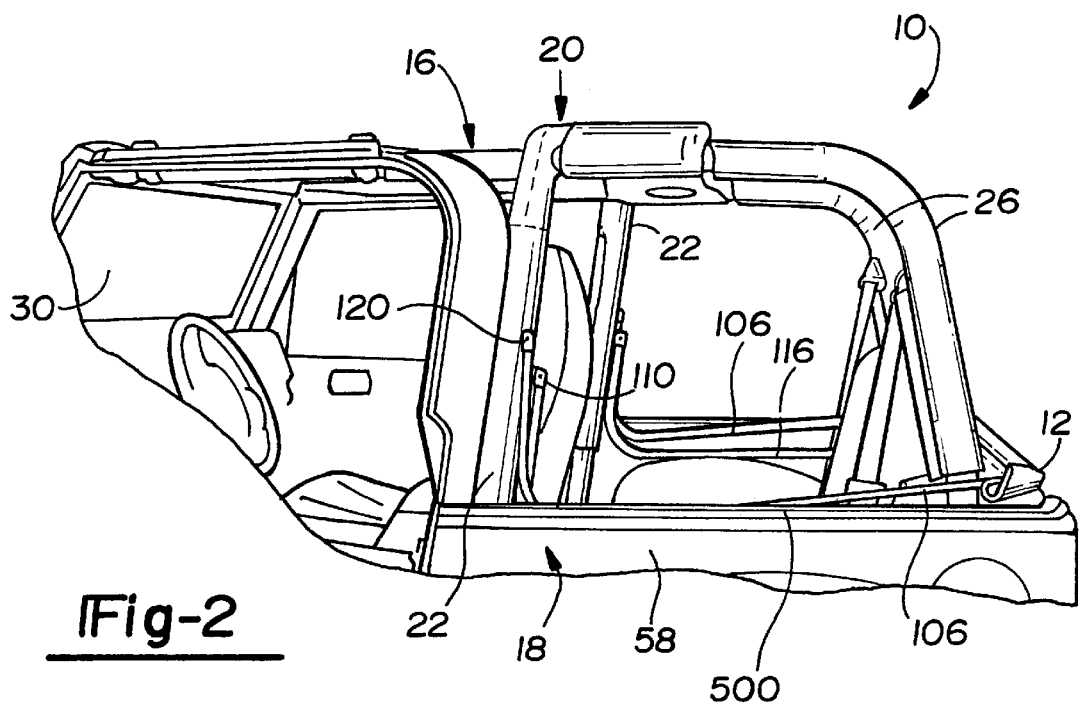
FIG. 2 is a fragmentary view of the exemplary motor vehicle of FIG. 1 illustrating the soft top folded to a retracted or stored position.
Figure 3:
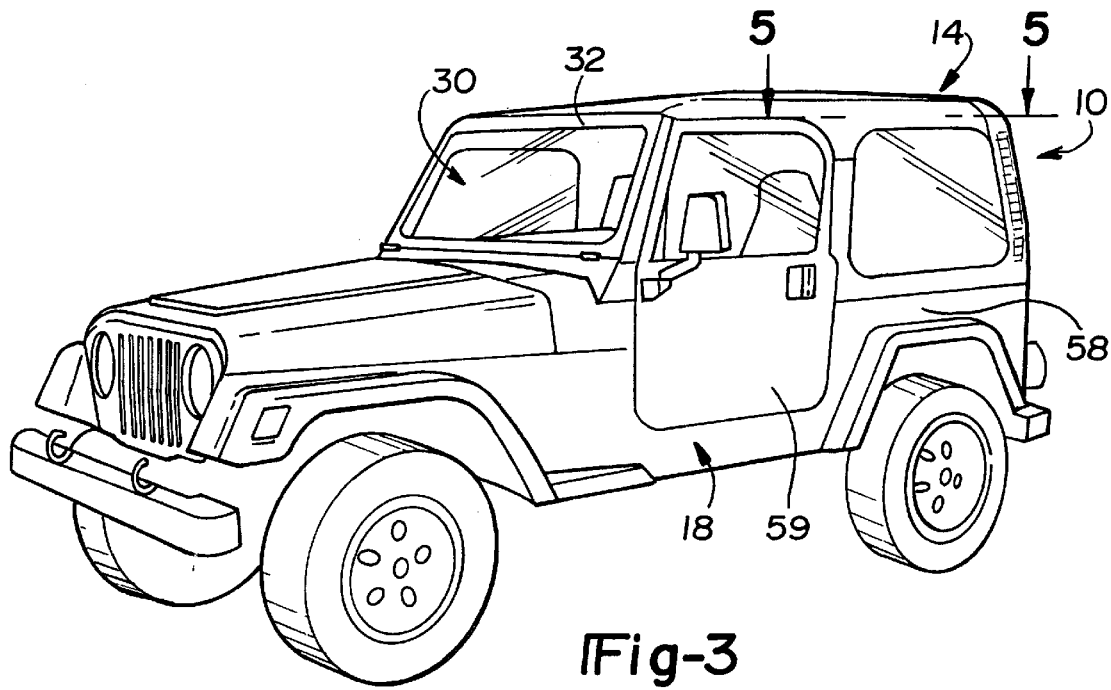
FIG. 3 a front perspective view similar to FIG. 1, illustrating the exemplary motor vehicle with the hard top operatively mounted over the soft top.
Figure 4:
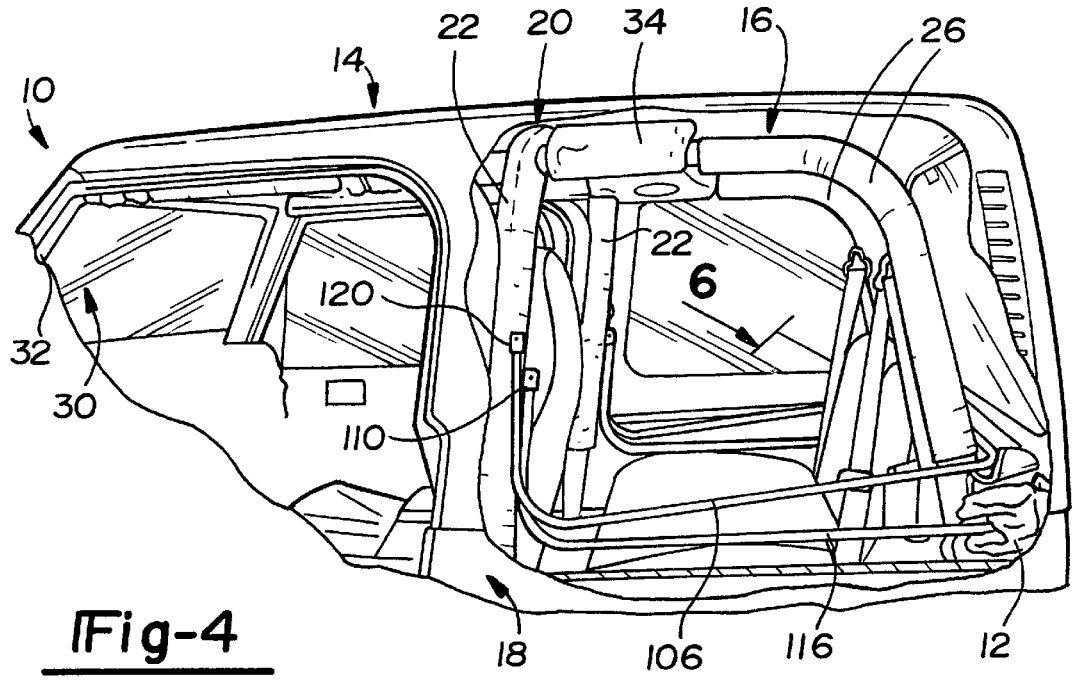
FIG. 4 is a cutaway view of a portion of the motor vehicle of FIG. 3 further illustrating the soft top stored within the hard top.

Turning generally to the drawings, an exemplary motor vehicle shown to include a top system constructed in accordance with the teachings of the present invention is generally identified with reference numeral 10. The motor vehicle 10 will be understood to be generally of the type sold by Chrysler Corporation, the assignee of this application, under their registered trademark JEEP. FIG. 1 shows the exemplary motor vehicle 10 with a soft top 12 installed to an operative position to protect passengers in the occupant compartment from wind, rain and other adverse weather conditions. FIG. 2 is an enlarged side view of the exemplary motor vehicle 10 shown with the soft top 12 folded to a stored position. In a manner which will be described below, the soft top 12 may be articulated between its operative position and its stored position. FIG. 3 shows the exemplary motor vehicle 10 with a hard top 14 mounted thereon.

The exemplary motor vehicle 10 is shown to include a sport bar assembly 16 which upwardly extends from the vehicle body 18. The sport bar assembly 16 is shown most clearly in FIG. 2 to include a main hoop 20 which is generally U-shaped. The main hoop 20 includes a pair a laterally spaced apart vertical members 22 interconnected by a transverse member 24. The sport bar assembly 16 is shown to further include a pair of rear hoops 26 welded to the main hoop 20 and extending rearward therefrom. Further, the sport bar assembly 16 includes a pair of side bars 28 bolted to the main hoop 20 and forwardly extending adjacent to a vehicle windshield assembly 30. The side bars 28 are received in cylindrical recesses (not shown) provided in a frame 32 of the windshield assembly 30. The sport bar assembly 16 is shown in the drawings partially covered with suitable padding 34.

The soft top 12 is constructed of fabric and illustrated to generally include a top section 36, laterally spaced apart side sections 38, and a rear section 40. A quarter window 42 is attached to each of the laterally spaced apart side sections 38 with a zipper 44. In a similar manner, a zipper 46 attaches a rear window 48 to the rear section 40.

With the foregoing description of the exemplary motor vehicle 10 as background, the various specific features of the present invention will now be described.

I. Apparatus for Articulating the Soft Top Between an Operative Position and a Stored Position With specific reference to FIGS. 2, 4, 5 and 7–10, the motor vehicle 10 is shown to include an apparatus for articulating the soft top 12 between the operative position and the stored position. As will become apparent below, the apparatus further functions to support the soft top 12 in its operative position.

The apparatus for articulating the soft top 12 has a plurality of support members including a forward support member 100 (or #1 bow), an intermediate support member 102 (or #2 bow), and a rearward support member 104 (or #3 bow). The #1 bow comprises a header portion 100 which is conventionally sewn within a forward edge 50 of the top section 36 of the soft top 12 (shown in FIG. 12). The #2 bow 102 transversely extends across the underside of the soft top 12 for supporting the fabric of the soft top 12 in a cross-car direction and the #3 bow 104 supports an upper rear corner 52 of the soft top 12 when the soft top 12 is in the operative position.

The #1 bow 100 is interconnected to the motor vehicle 10 for rotation about a first transverse pivot axis through a pair of side bows 106. The side bows 106 are each generally L-shaped, having a first end 107 operatively interconnected with the #1 bow 100 and a second end 108 pivotally attached to the main hoop 20 of the sport bar assembly 16. The second ends 108 of the side bows 106 are each received in a knuckle 110 which is pivotally attached to a respective mounting plate 112. The mounting plate 112 is fixedly attached to an associated vertical member 22 of the main hoop 20 of the sport bar assembly 16 with threaded fasteners 114. The second ends 108 of the side bows 106 cooperate to define the first transverse pivot axis.

The #3 bow 104 extends in a transverse direction and is captured within the upper rear edge 52 of the soft top 12. The #3 bow 104 is preferably integrally formed with a pair of L-shaped members 116 which function to pivotally interconnect the #3 bow 104 to the motor vehicle 10 for rotation about a second transverse pivot axis. Both of the L-shaped members 116 of the #3 bow 104 include an end 118 which is received into a knuckle 120 pivotally attached to the mounting plate 112. The ends 118 of the L-shaped members 116 cooperate to define the second transverse pivot axis. In the preferred embodiment, the first and second transverse pivot axes are spaced apart from each other both vertically and horizontally.

Figure 5:
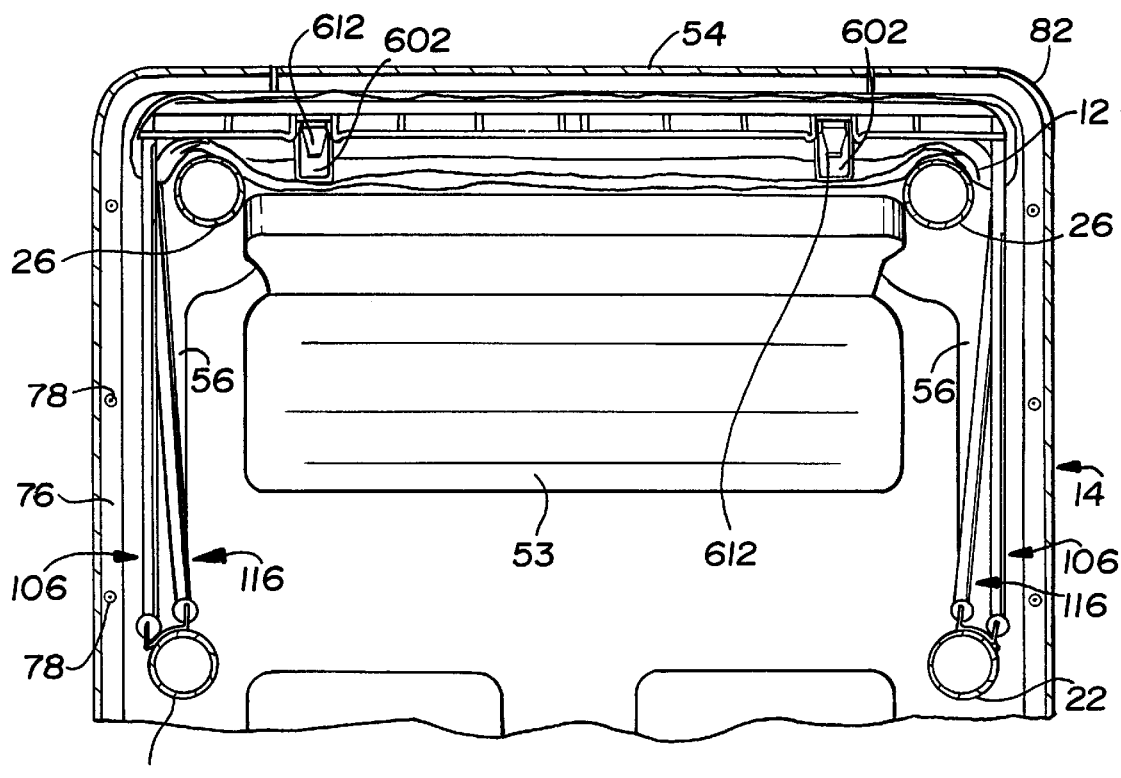
FIG. 5 is a partial cross-sectional view taken along the line 5—5 of FIG. 3.

As shown most clearly in the top sectional view of FIG. 5, the L-shaped members 116 attaching the #3 bow 104 to the sport bar assembly 20 both diverge in an outboard direction as they extend from the sport bar assembly 20. This geometry provides a full shape for the soft top 12 in its operative position while allowing the plurality of support members 100, 102, and 104 to be positioned entirely within the body 18 of the vehicle 10 when the soft top 12 is stored. The significance of this feature will become more apparent below when concurrent mounting of the hard top 14 and the soft top 12 to the motor vehicle 10 is described.

The specific manner in which the soft top is installed is described below. Briefly, when the side sections 38 and the rear section 40 of the top 12 are attached to the motor vehicle 10, the L-shaped members 116 are permitted to flex. Such flexing provides a spring load which serves as a counterforce to the fabric of the soft top 12, thereby retaining the soft top 12 in a taut condition.

The #2 bow 102 includes two downwardly extending ends 121 (shown most clearly in FIG. 9) which are supported on an associated one of the side bows 106 when the soft top 12 is in its installed position. To this end, each downwardly extending end 121 of the #2 bow 102 is attached to a support member 122 which defines a groove 124 for receiving one of the side bows 106. The #2 bow 104 is preferably pivotally interconnected to each of the side bows 106 through a link rod 126.

The apparatus for articulating the soft top 12 of the present invention further includes a pair of tension straps 128. Each of the tension straps 128 includes a first end 130 attached to one of the downwardly extending ends 121 of the #2 bow 102 and a second end 132 attached to one of the side bows 116 immediately adjacent the #3 bow 104. The tension straps 128 cooperate to draw the soft top 12 taut in a longitudinal direction when the soft top 12 is in its operative position.

When the soft top 12 is articulated from its stored position (shown in FIG. 2), through an intermediate position (shown In FIG. 8), and ultimately to an operative position (shown in FIG. 1), the side bows 106 function to carry the #1 bow 100 and the #2 bow 102 through corresponding pivoting arcs from a cavity located between the rear seat 53 and the tailgate 54 to the top of the windshield frame 32. Concurrently, the #3 bow 104, which when the soft top 12 in its operative position frames and supports the upper rear corner 52 of the soft top 12, pivots about the second transverse pivot axis which is disposed immediately rearward and below the first transverse pivot axis. The #3 bow 104 pivots down to rest on the top of the rear wheel house panels 56 which are inboard of the body side panels 58 and forward of the tailgate 54. As the side bows 106 articulate forward, the #2 bow 102 pivots on the side bows 106 to clear the rear hoops 26 of the sport bar assembly 16. The #2 bow 102 comes to rest on the top of the L-shaped members 116, and the side bow 106 and the #1 bow 100 come to rest on top of the #2 bow 102.

In the stored position, the fabric of the soft top 12 is attached to the #1, #2, and #3 bows 100, 102 and 104 and is folded around and into a stowed bow assembly to form a minimal visible stack. A wrap or boot (not shown) may be used to gather the loose fabric and also may be used to contain the rear and quarter windows 48 and 42.

II. Removable Door Frame Assembly

With specific reference to FIGS. 14, 15 and 20–28, the top system of the present invention is shown to include a removable door frame assembly 200. The removable door frame assembly 200 shown throughout the drawings is specifically configured for the driver's side of the motor vehicle 10. However, it will be understood by those skilled in the art that the exemplary motor vehicle 10 includes a removable door frame assembly for the passenger's side which is a substantial mirror image thereof. As will become apparent below, the removable door frame assembly 200 continues the shut-face or opening aperture into which either a full door 59 or a removable window assembly 300 for a lower door assembly 60 sits. The removable door frame assembly 200 further functions to retain the top section 36 of the soft top 12 in a cross-car direction and the side section 38 of the soft top 12 in a longitudinally direction.

The removable door frame assembly 200 is shown to include a first portion 202 which is adapted to releasably engage the motor vehicle 10 in a horizontal orientation and a second portion 204 adapted to releasably engage the motor vehicle 10 in a vertical orientation. Preferably, the first and second portions 202 and 204 are pivotally interconnected with a pin 206. Such pivotal interconnection permits the removable door frame assembly 200 to be folded (as specifically shown in FIG. 28), thereby facilitating storage within the motor vehicle 10 upon removal.

With particular reference to the cross-sectional view of FIG. 22, the first portion 202 of the removable door frame assembly 200 is integrally formed to include a pair of mounting portions 208. The mounting portions 208 are similarly constructed to include an upper flange 210 and a lower flange 212 which cooperate to partially define an arcuate recess 214. The arcuate recess 214 is sized to receive one of the side bars 28 of the sport bar assembly 16. The upper and lower flanges 210 and 212 are formed to include aligning apertures 216 and 218, respectively, adapted to receive a threaded fastener 220. The fastener 220, which has an oversized head 222 to facilitate manual installation, is passed through the aperture 216 in the upper flange 210, through an aperture 224 in the side bar 28, and engages a captured nut (not specifically shown) provided in the lower flange 212.

An upper side 226 of the first portion 202 is integrally formed to include a longitudinally extending recess 228 which accommodates an adjacent one of the side bows 106 when the soft top 12 is in the operative position. The first portion 202 is further integrally formed to include a downwardly extending lip 230 which partially defines the door shut-face. The downwardly extending lip 230 is adapted to abut a seal 62 carried by the full vehicle door 59 or the removable window assembly 300.

The second portion 204 of the removable door frame assembly 200 is integrally formed to include a lip or flange 232 (shown most clearly in FIG. 21) which forwardly extends and cooperates with the downwardly extending lip 230 of the first portion 202 to partially define the door shut-face. A lower end 234 of the second portion 204 is formed to include a cylindrical aperture 236 for receiving a locating pin 240. The locating pin 240 is adapted to engage a B-pillar grommet assembly 242 carried by the vehicle body 18.

The lower end 234 of the second portion 204 is further integrally formed to include a downwardly extending flange 243 which cooperates with the body 18 of the vehicle 10 to prevent rotation of the second portion 204 relative to the motor vehicle 10. Thus, the pin 240 and flange 243 cooperate to provide positive containment of the removable door frame assembly 200 in the longitudinally and cross-car directions, while being passive in a vertical direction. Vertical containment of the removable door frame assembly 200 is managed through the molded upper and lower flanges 210 and 212 of the first portion 202 which are attached to the side bar 28.

The first and second portions 202 and 204 of the removable door frame assembly 200 are formed to include molded-in-channels 244 and 246, respectively, for retaining the soft top 12 in an operative position. In this regard, the molded-in-channel 244 of the first portion 202 extends in a generally longitudinally direction and is adapted to removably receive a retainer element 400 fixedly attached to the top section 36 of the soft top 12. As shown most clearly in the cross-sectional view of FIG. 22, the molded-in-channel 244 of the first portion 202 is defined by a generally U-shaped segment 248 of the first portion 202 which opens downwardly. The distal end of the segment 248 is angled slightly outward as it extends down to facilitate entry of the retainer element 400. The retainer element 400, which is described in more detail in Section IV below, is retained under the tension of the top section 36 of the soft top 12, thereby retaining and tensioning the soft top 12 in a cross-car direction.

In a similar manner, the molded-in-channel 246 (shown most clearly in FIG. 21) of the second portion 204 of the removable door frame assembly 200 is defined by a generally U-shaped segment 250 which is adapted to receive a portion of a U-shaped forward retainer element 62 fixedly attached to the side portion 38 of the soft top 12. In the preferred embodiment, the retainer elements 62 and 400 are attached to their associated portions of the soft top 12 through stitching (not shown). The molded-in-channel 246 of the second portion 204 functions to longitudinally retain the side section 38 of the soft top 12.

III. Removable Door Window Assembly

Figure 29:
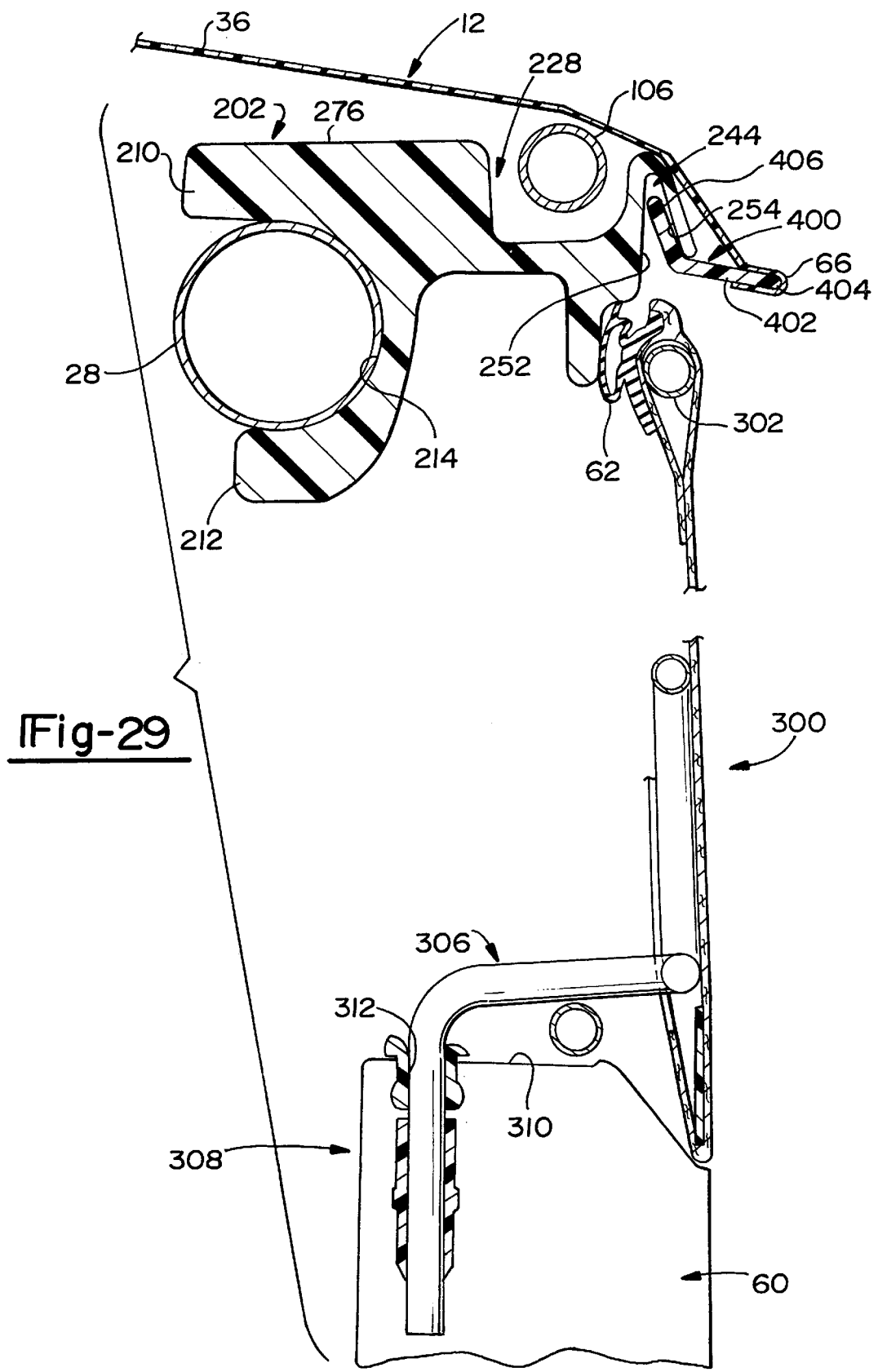
FIG. 29 is a cross-sectional view vertically taken through the removable window assembly of the present invention as it operatively attached to the motor vehicle.

With specific reference to FIGS. 29–31, the removable window assembly 300 of the present invention is shown to include a wire window frame 302 which defines a window opening 304 and a mounting arrangement for removably attaching the wire window frame 302 to the lower door assembly 60. In the exemplary embodiment illustrated, the mounting arrangement includes a plurality of wire pins 306 interconnected to the window frame 302 in a corresponding plurality of grommet assemblies 308 provided in an upper surface 310 of the lower door assembly 60. The wire pins 306 are preferably L-shaped so as to position the outer surface of the door and its seals relative to the grommet assemblies 308.

The wire of the wire window frame 32 has a diameter sufficient to hold it against the seal flange (not specifically shown) carried by the windshield frame 32. The grommet assemblies 308 define apertures 312 for receiving the pins 306 as a result of limited clearance between the pins 306 and their corresponding apertures 312, the window frame 302 must be lifted in a substantially vertical direction in order to remove it from the lower door assembly 62.

The window frame 302 is configured to cooperate with the shut-face surface which is cooperatively provided by the lateral edge 64 of the windshield frame 32 and the removable door frame 200. In this regard, the downward extending flange 230 of the removable door frame assembly 200 and a similar flange provided by the lateral edge 64 of the windshield frame 32 to prevent removal of the window frame 303 when the lower door assembly 60 is in the closed position. The lateral side 64 of the windshield frame 32 and the removable door frame assembly 200 laterally extend beyond the window frame 302. Thus, the windshield frame 32 and the removable door frame assembly 200 cooperate as a passive interference device to prevent the window frame 302 from being removed when the lower door assembly 60 is closed while allowing the window frame 302 to be easily removed when the lower door assembly 60 is open.

IV. Retainer Member for Attaching the Soft Top to the Motor Vehicle

Figure 14:
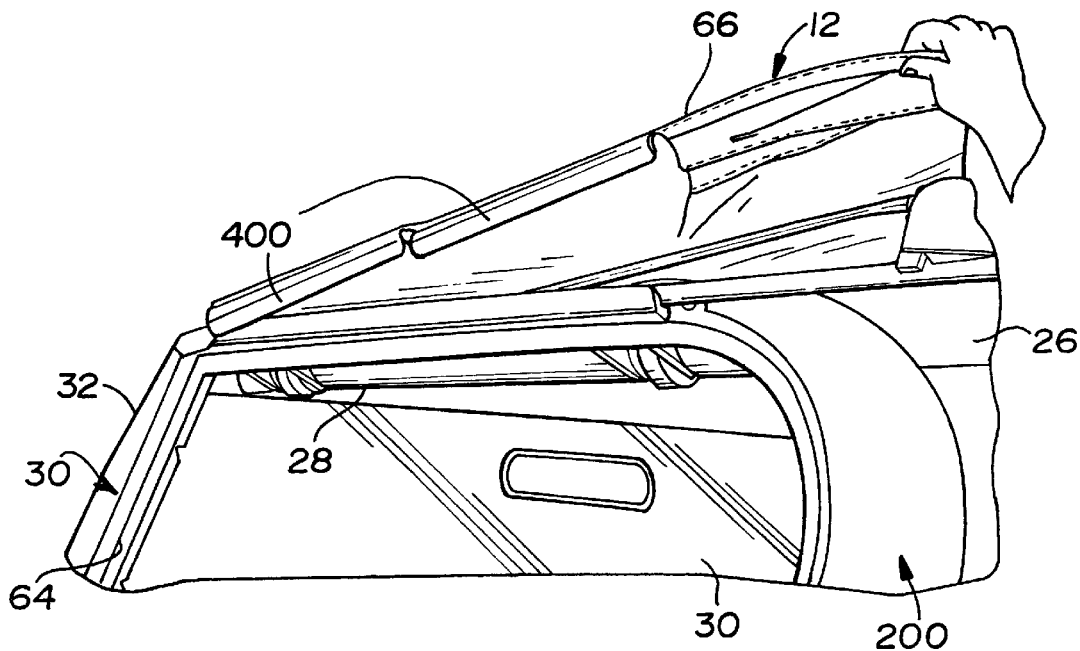
FIG. 14 is another enlarged perspective view of a portion of the exemplary motor vehicle of FIGS. 1 and 2, illustrating the step of attaching the deck fabric retainers into a horizontally oriented molded-in channel provided in a removable door frame assembly.

With specific reference to FIG. 14, and the cross-sectional views of FIGS. 22 and 29, the retainer member 400 introduced above in Section II regarding the removable door frame assembly 200 will be further described. The retainer member 400 functions to retain the fabric of the soft top 12 in a cross-car direction (i.e., a transverse direction) and further functions to shingle the vehicle door 59 or 60 by forcing water (e.g., rain and condensation) to fall away from the top of the door 59 or 60, thereby preventing water intrusion.

As shown in the perspective view of FIG. 14, the present invention preferably includes a pair of substantially identical retainer members 400 which interconnect a lateral edge 66 of the top section 36 of the soft top 12 with the molded-in channel 244 of the first portion 202 of the removable door frame assembly 200. Each retainer member 400 is integrally formed of a rigid plastic material to include a first portion preferably in the form of a first flange 402. The first flange 402 is adapted to be fixedly attached to the lateral edge 66 of the soft top 12. In the exemplary embodiment, the lateral edge 66 of the soft top 12 wraps around an edge 404 of the first flange 402 and is sewn to the first flange 402.

Each of the retainer members 400 is shown to further include a second portion 406. The second portion 406 is illustrated to preferably comprise a second flange 406 adapted to be inserted into the molded-in channel or recess 244 of the removable door frame assembly 200 and cooperate with the channel 244 to oppose a bending moment introduced by tensioning of the soft top 12 in a lateral direction. The second flange 406 is shown to be preferably disposed at an obtuse angle relative to the first flange 402.

As shown in the cross-sectional views of FIGS. 22 and 29, the channel 244 defined by the removable door frame assembly 200 is integrally molded into the first portion 202 of door frame assembly 200 and opens in a generally downward direction. The opposing sides 252 and 254 which define the molded-in channel 244 retain the retainer member 400 in an interference fit. In this regard, the second flange 406 of the retainer member 404 is fully inserted into the channel 244. The tension of the fabric top 12 in a lateral direction introduces a bending moment to the retaining element 400 which is opposed through contact of the opposing sides 252 and 254 with the second flange 406, thus holding the soft top 12 cross-car between the doors 59. The first flange 402 laterally extends beyond the removable door frame assembly 200 so that condensation and rain is laterally carried away from the door 59.

Turning to FIG. 32, an alternative construction of a retaining member 400' is illustrated. In this construction, the first flange 402' is upwardly turned and interconnected to the second flange 406' through an intermediate portion 412. The first and second flanges 402' and 406' and the intermediate portion 412 cooperate to define a rain trough 414 for carrying water and condensation rearward. Preferably the fabric of the soft top 12 is attached (e.g., sewn) to both the intermediate portion 412 and the first flange 402'.

V. An Apparatus for Selectively Mounting the Hard Top and the Soft Top to the Motor Vehicle With specific reference to FIGS. 2, 6,19, 22 and 23, the present invention is shown to include an apparatus 500 for selectively mounting the hard top 14 and the soft top 12 to the motor vehicle 10. As will become apparent below, the apparatus for selectively mounting the hard top 14 and the soft top 12 further functions to cover a raw sheet metal edge of the body side panel 58 in an effective and cost efficient manner. Pertinent to the present invention, the body side panel 58 (shown most clearly in FIG. 22) of the motor vehicle 10 upwardly extends and includes a generally horizontal upper portion 70. The body side panel 58 also includes a downwardly extending distal flange 72 on the inboard side which terminates at a raw edge 74.

The apparatus comprises a retaining member 500 which is longitudinally elongated to extend the entire length of the body side panel 58 of the motor vehicle 10. The retainer member 500 is shown to generally include an intermediate portion 502, an outboard flange 504 and an inboard flange 506. The intermediate portion 502 is adapted to be horizontally oriented and fixedly attached to the generally horizontal upper portion 70 of the body side panel 58. In the preferred embodiment 502, the intermediate portion 502 is welded to the body side panel 58. As shown in FIG. 19, the retainer member 500 preferably extends around a rear corner 82 of the motor vehicle 10 and includes a substantially identical portion which is attached to a sheet metal panel adjacent the vehicle tailgate 54.

Figure 6:
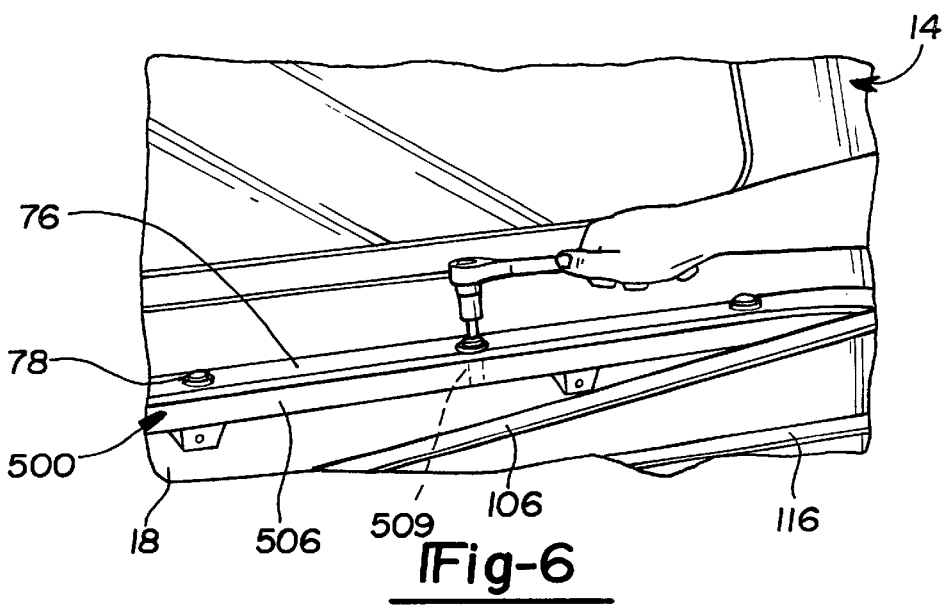
FIG. 6 is a view of an interior portion of the motor vehicle of FIG. 4 taken in the direction of Arrow 6 of FIG. 4 illustrating attachment of the hard top to the body of the motor vehicle.
Figure 10:
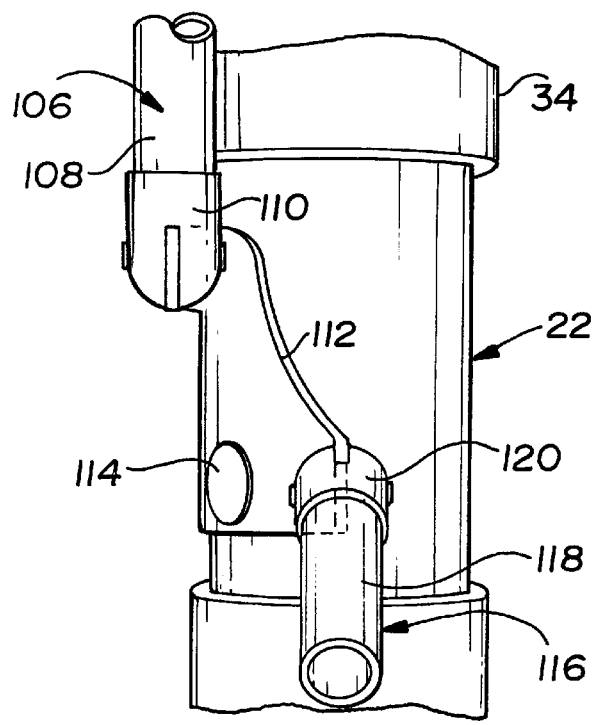
FIG. 10 is an enlarged view taken in the direction of Arrow 10 of FIG. 7 showing a portion of the padding cut-away from the main hoop of the sport bar assembly to illustrate the mounting bracket for the bows of the soft top.

The upper surface of the intermediate portion 502 provides a flat surface for supporting the hard top 14. As shown in FIGS. 5 and 6, the hard top 14 includes an inwardly extending flange 76 which rests on the intermediate portion 502. Threaded fasteners 78 pass through apertures (not specifically shown) provided in the inwardly extending flange 76 and engage captured nuts 509 retained by the intermediate portion 502.

The outboard flange 504 downwardly extends from the intermediate portion 502 and terminates in an inner curled portion 510. The inner curled portion 510 is spaced apart from the outer surface of the body side panel 58 of the motor vehicle 10 and defines a gap 512 for receiving one or more rigid retainers 80 (identified in FIG. 15) attached to the bottom edge of the side section 38 of the soft top 12.

The inboard flange 506 extends downwardly beyond the downwardly extending distal flange 72 of the body side panel 58. The inboard flange 506 terminates at a curled inner edge 514. The curled inner edge 514 functions to conceal the raw sheet metal edge 74.

In the preferred embodiment, the retainer member 500 is a one-piece, seamless and continuous part constructed from steel. The retainer member 500 is preferably welded to the body side panel 58 before the motor vehicle 10 is painted. By attaching the retainer member 500 a motor vehicle 10, a customer may initially purchase a hard top 14, and at any later date add a soft top 12 without the necessity of adding any body side retainers for properly retaining the soft top 12.

Figure 11:
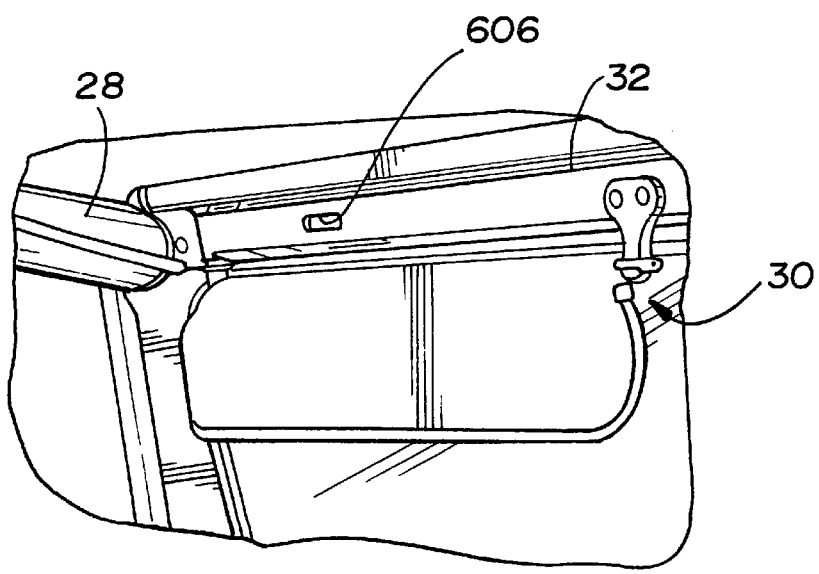
FIG. 11 is a view of an interior portion of the exemplary motor vehicle of FIGS. 1 and 2 taken in the direction of Arrow 11 in FIG. 7.

VI. Apparatus for Latching the Hard Top or the Soft Top to the Motor Vehicle With specific reference to FIGS. 11–13, an apparatus 600 for latching the hard top 14 or the soft top 12 to the motor vehicle 10 (e.g., a latching arrangement 600) of the present invention will be described. The latching arrangement 600 as it relates to the soft top 12 is shown in FIG. 12 and as it relates to the hard top 14 in FIG. 13. The latching arrangement 600 includes a latching mechanism 602 for the soft top 12, a latching mechanism 604 for the hard top 14, and a horizontally elongated slot 606 located in an upper portion of the windshield frame 32. The slot 606 in the sheet metal of the windshield frame 32 is extruded and formed to present a rugged, durable attachment area.

Figure 12A:
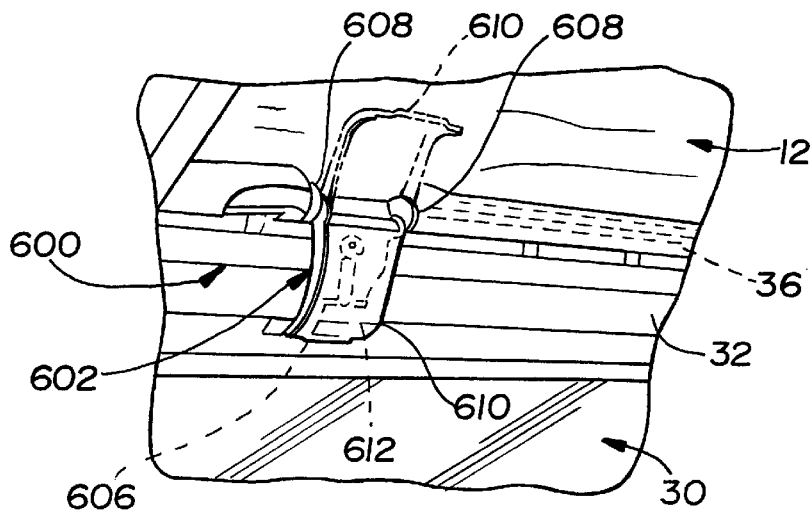
FIG. 12A is a view similar to FIG. 11, illustrating the latching arrangement of the top system of the present invention interconnecting the soft top to the windshield frame.
Figure 12B:
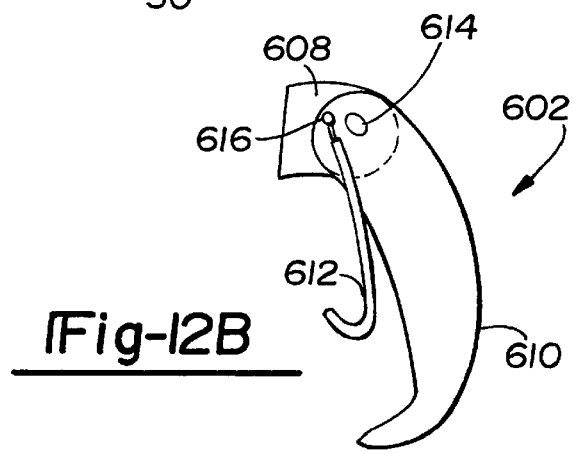
FIG. 12B is a side view of the latching arrangement of FIG. 12A.

As shown in FIGS. 12A and 12B, the latching mechanism 602 for the soft top 12 includes a pair of base plates 608 attached to the header 100, a manually displaceable handle 610 and a hook member 612. The handle 610 is pivotally attached to the base plates 608, which are attached to spaced apart portions of the header 100. In this regard, the handle 610 is pivotable about an axis defined by a pin 614 between a latched position (shown in solid lines in FIG. 12A) and an unlatched position (shown in broken lines in FIG. 12B).

The hook member 612 of the latching mechanism 602 for the soft top 12 is shown in FIG. 12B pivotally attached to the handle through a pin 616. The pivot axis for the hook member 612 defined by the pin 616 is offset from the pivot axis for the handle 610. When the handle 610 is in its latched position, the pivot axis for the hook member 612 is slightly above the pivot axis for the handle 610. As a result, an undercenter mechanical geometry (essentially an overcenter mechanical geometry with a reverse orientation) is established between the two pivot axes.

In latching the soft top 12 to the windshield frame 32, the handle 610 is rotated downward to its latched position, and the hook member 612 is engaged with the horizontally elongated slot 606. Such downward rotation of the handle member 610 draws the hook member 612 upward to engage the slot 606. The handle 610 provides a lever arm for creating the necessary force to actuate the hook member 612 and further provides a mechanical advantage to draw the hook member 612 into the elongated slot 606 and compress a header seal (not shown) located on the top of the windshield frame 32. The header seal and the fabric of the soft top 12 provide a resistance force for keeping the latching mechanism 602 in tension such that the undercenter orientation retains the latch mechanism 602 closed and secure.

Figure 13:
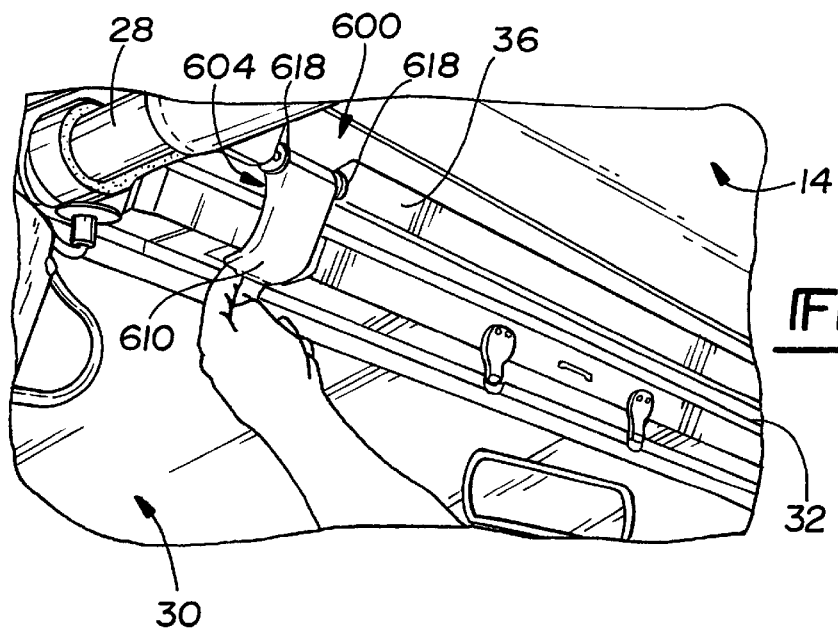
FIG. 13 is a view similar to FIG. 11, illustrating the latching arrangement of the top system of the present invention interconnecting the hard top to the windshield.

Turning to FIG. 13, the latching mechanism 604 for the hard top 14 is illustrated in its latched position. The hook member 612 and handle 610 of the hard top latching mechanism 604 are identical in construction and function to corresponding elements of the soft top latching mechanism 602. The base plates 618 of the hard top latching mechanism 604 similarly function to pivotally interconnect the handle with the top header 100 and are the only components not identical between the latching mechanisms 602 and 604.

VII. Motor Vehicle Top System in Which the Hard Top May Be Operatively Installed Over the Folded Soft Top As noted above, the top system of the present invention allows the hard top 14 to be operatively installed over the folded soft top 12. One purpose of this feature is to allow delivery of both tops 12 and 14 to the customer. Another purpose is to allow for an expanded range of uses of the vehicle 10. The owner/user can have the hard top 14 on for greater comfort and less noise on long trips and on arrival, take the hard top 14 off and have the soft top 12 for local use with the benefit of open air driving. The soft top 12 is ready to be moved to its operative position or retained in the stored position for available protection from the element from adverse weather conditions.

The ability of the top system to allow the hard top 14 to be operatively installed over the folded soft top 12 is made possible largely in part due to the several unique aspects of the present invention described above. For example, the soft top 12 folds back and is contained within the boundaries of the body side 18 and the tailgate area while having a low stack height. Additionally, the retainer members 500 welded onto the body side section 58 allow the tops 12 and 14 to function interchangeably. As noted above, the captured nuts 509 carried in the retainer members 500 allow the hard top fasteners 78 to be easily accessible and installed even with the support bows 102–106 of the soft top 12 down in that area (as shown in FIG. 6). These features discussed above combine to allow the soft top 12 to fit under the hard top 14. In addition, a lower rear portion (not specifically shown) of the hard top side section is configured with a clearance on each side to allow the soft top 12 to fit under the hard top 14.

VIII. Method of Installing the Soft Top

Figure 15:
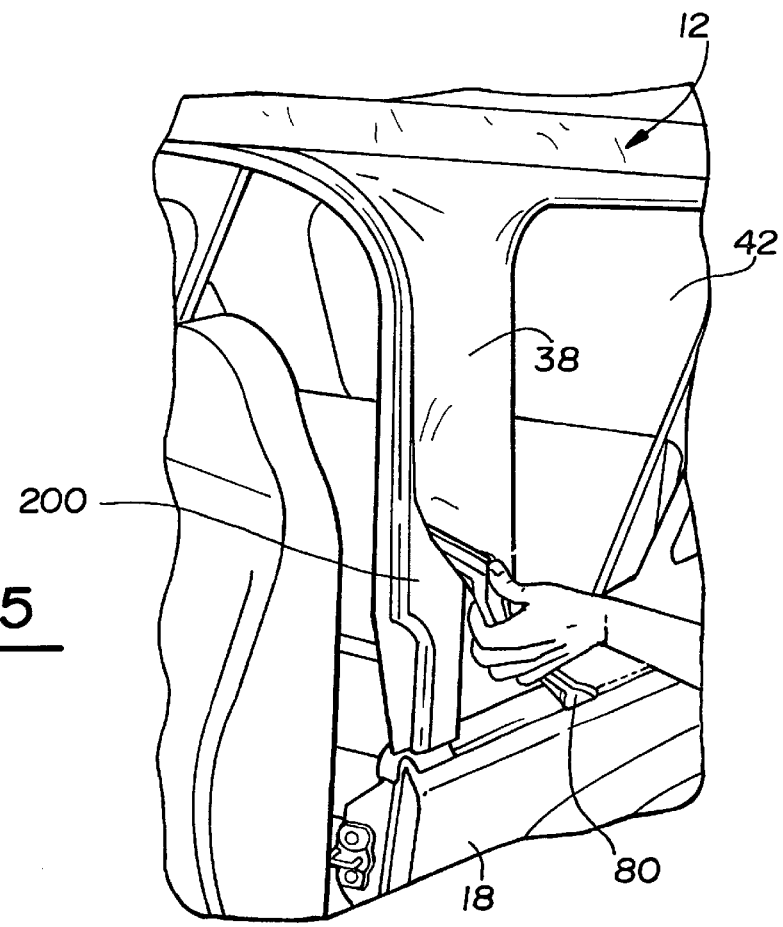
FIG. 15 is another perspective view of a portion of the exemplary motor vehicle of FIG. 1 and, illustrating the step of attaching the forward retainer in the quarter window into a vertically oriented molded-in channel provided in the removable door frame assembly.
Figure 16:
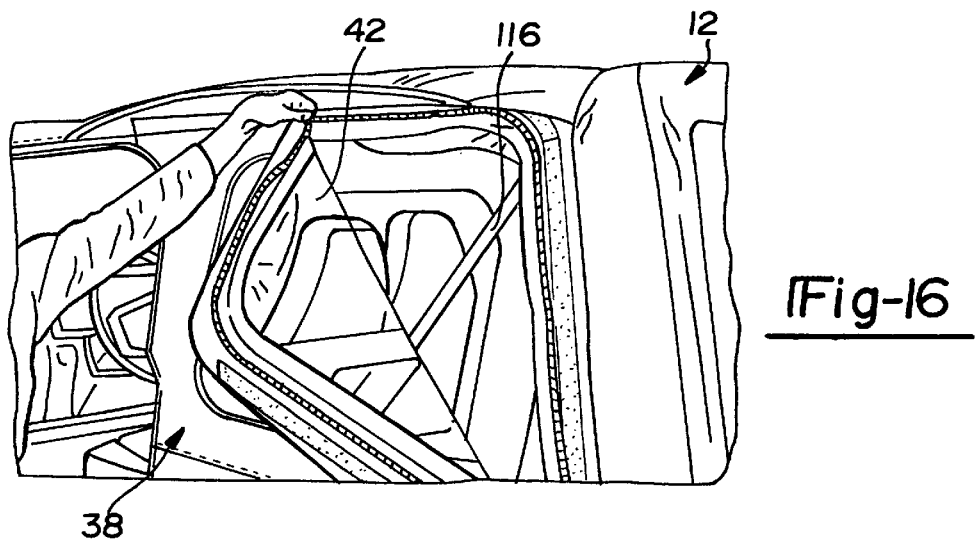
FIG. 16 is an enlarged perspective view of a portion of the exemplary motor vehicle of FIGS. 1 and 2, illustrating the step of attaching one of the side windows to the soft top.
Figure 17:
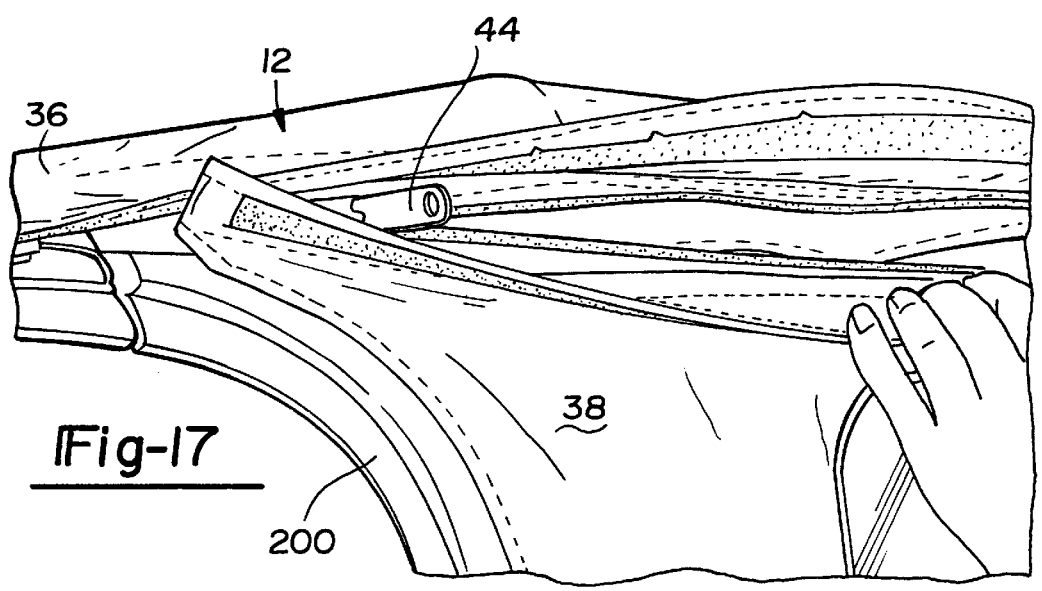
FIG. 17 is a further enlarged view of a portion of the exemplary motor vehicle of FIGS. 1 and 2.
Figure 18:
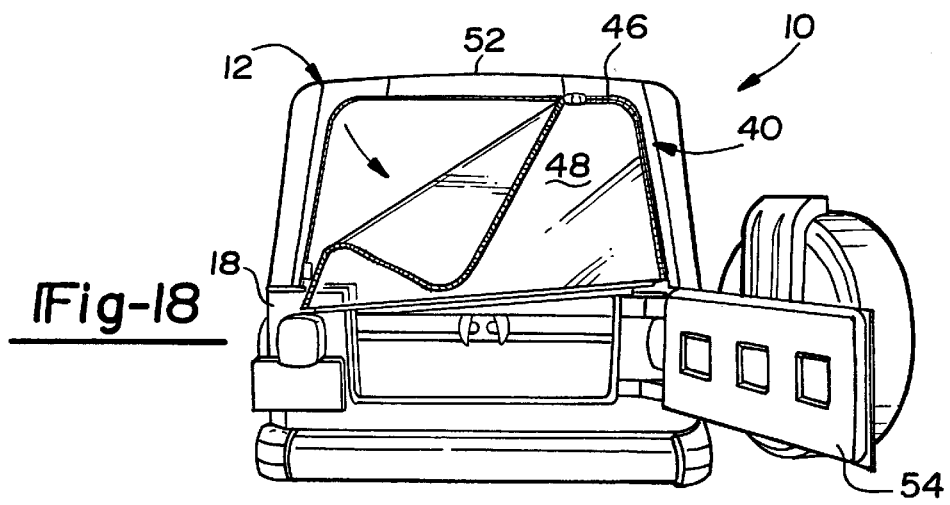
FIG. 18 is a rear view of the exemplary motor vehicle of FIGS. 1 and 2, illustrating the step of attaching the rear window to the soft top.
Figure 24:
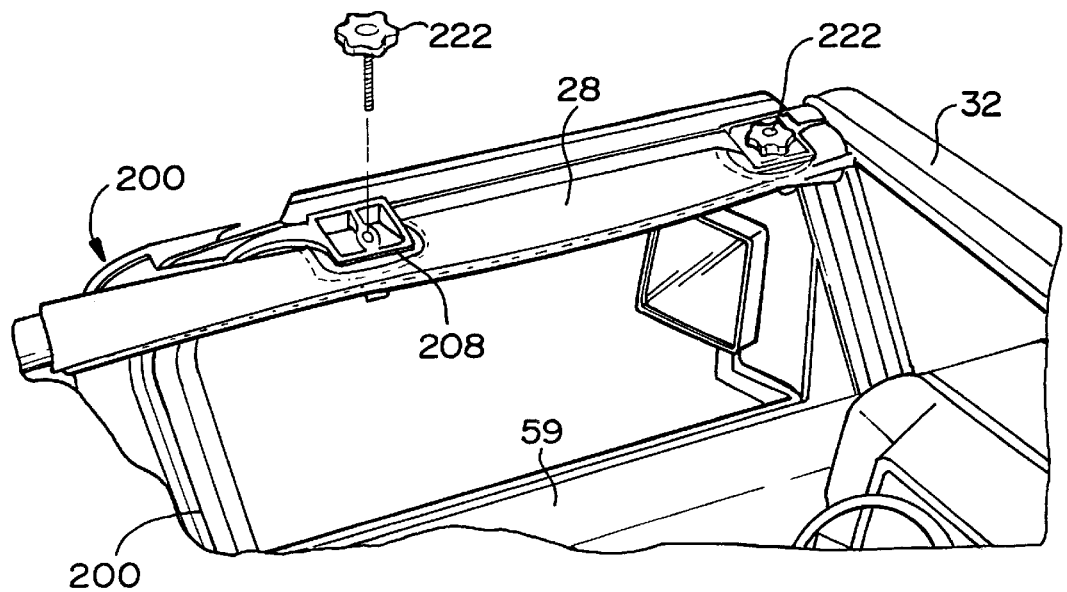
FIG. 24 is a top view of a portion of the motor vehicle of FIGS. 1 and 2 illustrating attachment of the removable door frame assembly to the sport bar assembly.
Figure 25:
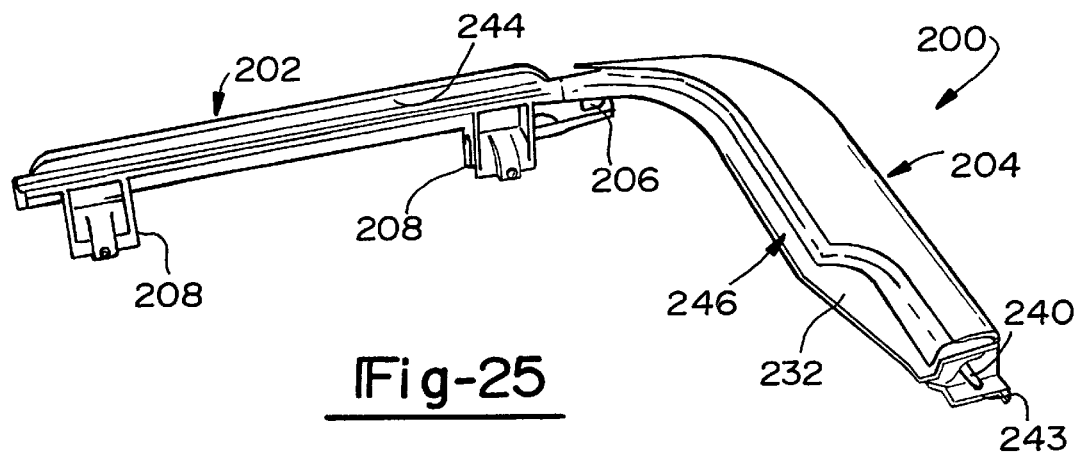
FIG. 25 is a perspective view of one of the removable door frame assemblies of the present invention.
Figure 26:
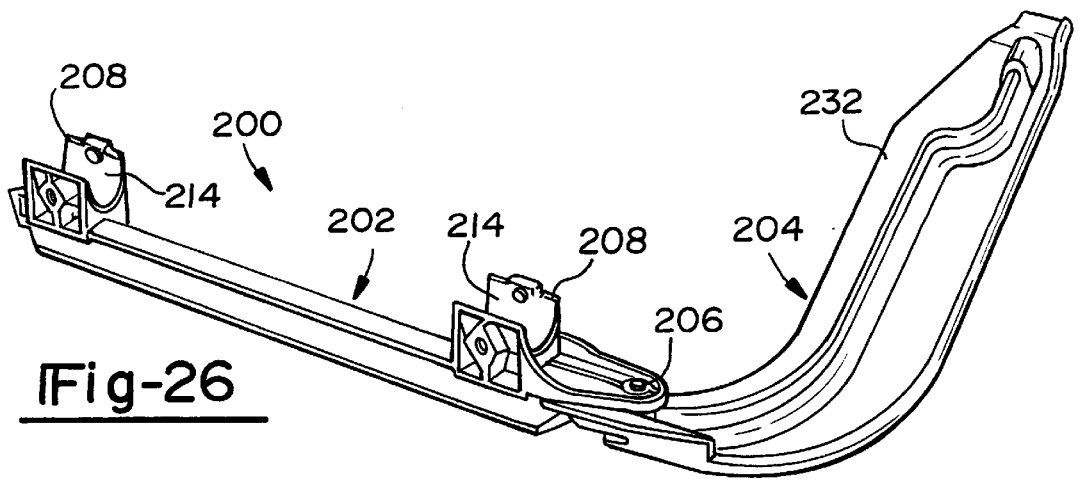
FIG. 26 is another perspective view of the removable door frame assembly of FIG. 25.

Installation of the soft top 12 utilizing the features of the present invention provides an improved method of tensioning the fabric of the soft top 12. The preferred method, which is illustrated throughout the drawings, includes the following general steps:

1. Articulating the soft top 12 from its stored position to its operative position (as shown in FIG. 8).
2. Engaging the latching mechanism 602 carried by the forward edge 50 of the soft top 12 with the windshield slot 606 by moving the handle 610 from the upper (unlatched) position to the lower (latched) position (as shown in FIG. 12A).
3. Zipping the rear window 48 in the rear panel 40 and the quarter windows 42 in the side sections 38 (as shown in FIG. 18).
4. Tucking in the retainers 400 into the horizontally oriented molded-in channels 244 of the removable door frame assembly 200 (as shown in FIG. 14).
5. Tucking the forward retainer 62 attached to the side section 38 of the soft top 12 into the vertically oriented molded-in channels 246 of the removable door frame assembly 200 (as shown in FIG. 15).
6. Tucking the retainer 80 of the side section 38 of the soft top 12 into the slot 512 defined by the welded-on retainer 500 on top of the body side panel 58, working from the front to the rear. As these retainers 80 are tucked in, the soft top 12 is gradually tensioned against the flexing of the L-shaped members 116.
7. Finally, rear corner retainers 84 in the soft top cover 12 are tucked in, effectively completing the securement and tensioning of the soft top 12. The fabric stretched over the bows provides the soft top's total tension (as shown in FIG. 19).

As noted, the arrangement for articulating the soft top 12, especially the L-shaped members 116 connected to the #3 bow 104, provides a spring load which serves as a counterforce to the fabric. Thus, the method of attaching the soft top 12 effectively employs a spring load in the bow assembly structure and the fabric of the soft top 12 without separate tensioning devices.

While the above description constitutes the preferred embodiment of the present invention, it will be appreciated that the invention is susceptible to modification, variation, and change without departing from the proper scope or fair meaning of the present invention. In this regard, while the various features of the present invention have been shown and described in connection with a specific motor vehicle, it will be appreciated by those skilled in that art that many of these features are suitable in connection with motor vehicles.

We claim:

1. A top system for a motor vehicle having a body side panel, the top system comprising:
    a soft top removably attached to the motor vehicle, the soft top operable to articulate between an operative position and a stored position;
    a hard top removably attached to the motor vehicle when the soft top is either removed from the motor vehicle or articulated to the stored position; and
    a retainer member fixedly attached to the body side panel, the retainer member including an upper horizontal surface having an aperture formed therein for receiving a fastener for supporting the hard top;
    wherein the retainer member integrally includes a first flange which downwardly extends from the upper horizontal surface, the first flange being adjacent an outboard side of the body side panel and being spaced apart from the outboard side of the body side panel so as to form a gap for receiving and retaining a portion of the soft top.

2. The top system of claim 1, wherein the first flange terminates in an inwardly curled edge.

3. The top system of claim 1, wherein the retainer member integrally includes a second flange which downwardly extends from the upper horizontal surface adjacent an inboard side of the body side panel.

4. The top system of claim 3, wherein the second flange terminates in an inwardly curled edge.

5. The top system of claim 1, wherein the retainer member longitudinally extends substantially the entire length of the body side panel and around a rear corner of the vehicle.

6. A top system for a motor vehicle including a sport bar assembly upwardly extending from a body and a pair of laterally spaced apart body side panels, the top system comprising:

a soft top;

a support arrangement for supporting the soft top in an operative position, the support arrangement operable for articulating between an operative mode and a stored mode such that the soft top is in an operative position when the support arrangement is in the operative mode and the soft top is in a stored position when the support arrangement is in the stored mode; and a hard top removably attached to the motor vehicle when the soft top is either removed from the motor vehicle or articulated to the stored position;

wherein the support arrangement includes a forward support member, an intermediate support member, a downwardly extending member and a rearward support member, the forward support member is attached to a forward edge of the soft top, the forward support member is pivotally interconnected to the vehicle for rotation about a first axis, the intermediate support member has a distal end pivotally interconnected to the forward support member, the downwardly extending member has a first end coupled to the intermediate support member at a point spaced apart from the distal end and a second end including a groove removably engaged with the forward support member thereby positioning the intermediate support member in vertical spaced relation to the forward support member, the rearward support member is operative for supporting an upper rear edge of the soft top when the soft top is in the operative position, the rearward support member is pivotally interconnected to the vehicle for rotation about a second axis, the first and second axes being spaced apart.

7. The top system for a motor vehicle of claim 6, wherein the support arrangement includes first and second L-shaped members pivotally interconnecting the forward support member to the sport bar assembly.

8. The top system for a motor vehicle of claim 6, wherein the support arrangement includes third and fourth L-shaped members pivotally interconnecting the rearward support member to the support bar assembly.

9. The top system for a motor vehicle of claim 7, wherein said first and second L-shaped members both include first ends pivotally attached to the sport bar assembly, both of the first ends located inboard from an adjacent one of the body side panels.

10. The top system for a motor vehicle of claim 8, wherein the third and fourth L-shaped members both include a first end pivotally attached to the sport bar assembly, the first end of both of the L-shaped members being positioned inboard from and adjacent one of the body side panels.

11. The top system for a motor vehicle of claim 6 wherein the soft top is positioned at a lower elevation than the first and second pivot axes when in the stored position.

12. A top system for a motor vehicle including a sport bar assembly and a body side panel having a generally horizontal upper portion and a downwardly extending distal flange, the top system comprising:

a soft top;

a support arrangement for supporting the soft top in an operative position, the support arrangement operable for articulating between an operative mode and a stored mode such that the soft top is in an operative position when the support arrangement is in the operative mode and the soft top is in a stored position when the support arrangement is in the stored mode, the support arrangement including a first support member, a second support member, a downwardly extending member and a third support member, the first support member attached to a forward edge of the soft top, and pivotally interconnected to the vehicle for rotation about a first axis, the second support member laterally extending across the soft top and including a distal end pivotally interconnected to the first support member, the downwardly extending member has a first end coupled to the second support member at a point spaced apart from the distal end and a second end including a groove removably engaged with the first support member thereby positioning the second support member in vertical spaced relation to the first support member, the third support member operative for supporting an upper rear edge of the soft top when the soft top is in the operative position and pivotally interconnected to the vehicle for rotation about a second axis;

a retainer member having a first portion and an outboard flange, the first portion fixedly attached to the body side panel and including an aperture formed therein, the outboard flange downwardly extending from the first portion and spaced apart from an outboard side of the body side panel so as to define a gap for receiving a portion of the soft top and retaining the soft top in a lateral direction; and a hard top removably attached to the motor vehicle when the soft top is either removed from the motor vehicle or articulated to the stored position, the hard top including a lower support surface supported on the first portion of the retainer member and including a fastener insertable within the aperture.

13. The top system for a motor vehicle of claim 12, wherein the first and second axes are vertically spaced apart.

14. The top system for a motor vehicle of claim 12, wherein the first and third support members are pivotally interconnected to the sport bar assembly.

15. The top system for a motor vehicle of claim 12, wherein the retainer member further includes an inboard flange downwardly extending from the first portion which downwardly extends beyond the downwardly extending distal flange of the body side panel.

16. The top system for a motor vehicle of claim 12, wherein the hard top has an inner side accommodating the soft top in a nested relationship.

17. The top system for a motor vehicle of claim 12, wherein the retainer member longitudinally extends substantially the entire length of the body side panel and around a rear corner of the vehicle.

* * * * *